(12) United States Patent
Kanao

(10) Patent No.: US 8,137,851 B2
(45) Date of Patent: Mar. 20, 2012

(54) FUEL CELL AND FUEL CELL MODULE

(75) Inventor: Yukihisa Kanao, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 433 days.

(21) Appl. No.: 12/438,933

(22) PCT Filed: Aug. 16, 2007

(86) PCT No.: PCT/JP2007/066321
§ 371 (c)(1),
(2), (4) Date: Feb. 25, 2009

(87) PCT Pub. No.: WO2008/023751
PCT Pub. Date: Feb. 28, 2008

(65) Prior Publication Data
US 2010/0015481 A1    Jan. 21, 2010

(30) Foreign Application Priority Data

Aug. 25, 2006   (JP) .................................. 2006-228761

(51) Int. Cl.
*H01M 8/06* (2006.01)
(52) U.S. Cl. ....................................... 429/408; 429/400
(58) Field of Classification Search ..................... 429/19
See application file for complete search history.

(56) References Cited

U.S. PATENT DOCUMENTS 5,270,131 A * 12/1993 Diethelm et al. ............. 429/456
5,418,079 A    5/1995 Diethelm et al.

FOREIGN PATENT DOCUMENTS

| EP | 0468698 A1 | | 1/1992 |
|---|---|---|---|
| JP | 6-44993 | | 2/1994 |
| JP | 10-294122 | | 11/1998 |
| JP | 2002-8681 | | 1/2002 |
| JP | 2002-151106 | | 5/2002 |
| JP | 2006185803 A | * | 7/2006 |

OTHER PUBLICATIONS

Campanari, Stefano, "Carbon dioxide separation from high temperature fuel cell power plants," *Journal of Power Sources*, vol. 112:273-289 (2002).

International Search Report for Application No. PCT/JP2007/066321, dated Feb. 6, 2008.

* cited by examiner

*Primary Examiner* — Barbara Gilliam
*Assistant Examiner* — Gary Harris
(74) *Attorney, Agent, or Firm* — Nelson Mullins Riley & Scarborough LLP; Anthony A. Laurentano

(57) ABSTRACT

Separators of a fuel cell include sandwiching sections which sandwich electrolyte electrode assemblies and have fuel gas channels, first bridges each having a fuel gas supply channel, and a fuel gas supply unit. A fuel gas supply passage extends through the fuel gas supply unit in a stacking direction. Further, the separators include second bridges each having an exhaust fuel gas channel for discharging the fuel gas after consumption in the electrolyte electrode assemblies as an exhaust fuel gas, and an exhaust fuel gas discharge unit having an exhaust fuel gas passage for allowing the exhaust fuel gas to flow in the stacking direction. The exhaust fuel gas discharge unit is connected to the fuel gas channel through the fuel gas supply passage.

9 Claims, 19 Drawing Sheets

US 8,137,851 B2

FUEL CELL AND FUEL CELL MODULE

RELATED APPLICATIONS

This application is a 35 U.S.C. 371 national stage filing of International Application No. PCT/JP2007/066321, filed 16 Aug. 2007, which claims priority to Japanese Patent Application No. 2006-228761 filed on 25 Aug. 2006 in Japan. The contents of the aforementioned applications are hereby incorporated by reference.

TECHNICAL FIELD

The present invention relates to a fuel cell formed by stacking an electrolyte electrode assembly between separators. The electrolyte electrode assembly includes an anode, a cathode, and an electrolyte interposed between the anode and the cathode. Further, the present invention relates to a fuel cell module including the fuel cell.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In use, generally, predetermined numbers of the electrolyte electrode assemblies and the separators are stacked together to form a fuel cell stack.

In the fuel cell, an air or an oxygen-containing gas such as a gas chiefly containing oxygen is supplied to the cathode, and a fuel gas such as a gas chiefly containing hydrogen (hereinafter also referred to as the hydrogen-containing gas) or CO is supplied to the anode. The oxygen-containing gas and the fuel gas after used in the reaction are discharged as an exhaust gas for disposal.

The exhaust gas contains unconsumed fuel gas. It is not economical to dispose of all the unconsumed gas as the exhaust gas. In this regard, for example, as a technique of reducing the amount of disposal in the unconsumed fuel gas, a fuel cell as disclosed in Japanese Laid-Open Patent Publication No. 2002-151106 is known.

As shown in FIG. 19, the fuel cell is formed by stacking thin disks 1 each comprising solid electrolyte material or the like and ring plate separators 2 alternately, and providing ring plate path separators 3, 4 on both surfaces of the disks 1.

A cell reaction channel 5a is formed between one surface of the disk 1 and the separator 2 through the path separator 3, and an air channel 5b is formed between the other surface of the disk 1 and the separator 2 on the other side through the path separator 4.

A through hole 6 as a fuel gas channel extends through centers of the disks 1. A plurality of combustion gas channels 7 are formed around the through hole 6. The through hole 6 is connected to an inlet of the cell reaction channel 5a through a distribution inlet hole 8a, and an outlet of the cell reaction channel 5a is connected to each combustion gas channel 7 through a discharge hole 8b.

The fuel gas (F) flows along the through hole 6, and flows into the cell reaction channel 5a through the distribution inlet holes 8a. The fuel gas turns back at the outer end of the disk 1, and flows into the combustion gas channel 7 through the discharge hole 8b. According to the disclosure, the unconsumed fuel gas discharged to the combustion gas channel 7 flows into the through hole 6 of a fuel cell (not shown) connected on the downstream side for allowing the unconsumed fuel gas to be used in the reaction again, and complete combustion is achieved.

In the conventional technique, the through hole 6 extends through centers of the disks 1, and a plurality of the combustion gas channels 7 are formed around the through hole 6. In the structure, the process of fabricating each disk 1 is considerably complicated, and special sealing structure is required. Further, since the shapes of the separator 2 and the path separators 3, 4 are complicated, the fuel cell does not have economical structure as a whole.

Further, the fuel gas before used in the reaction, and the fuel gas after used in the reaction are mixed together, and supplied to the cell reaction channel 5a sequentially. In the structure, concentration of the fuel gas supplied to each cell reaction channel 5a may not be uniform in the stacking direction. As a result, power generation reaction may differ depending on the disk 1.

DISCLOSURE OF INVENTION

The present invention solves the above problems, and an object of the present invention is to provide a fuel cell and a fuel cell module which make it possible to utilize unconsumed fuel gas again, and improve the utilization ratio of the fuel gas advantageously.

The present invention relates to a fuel cell formed by stacking an electrolyte electrode assembly and separators. The electrolyte electrode assembly comprises an anode, a cathode, and an electrolyte interposed between the anode and the cathode.

Each of the separators sandwiching the electrolyte electrode assembly comprises a sandwiching section, a first bridge, a fuel gas supply unit, a second bridge, and an exhaust fuel gas discharge unit. The sandwiching section has a fuel gas channel for supplying a fuel gas along an electrode surface of the anode and an oxygen-containing gas channel for supplying an oxygen-containing gas along an electrode surface of the cathode separately. The first bridge is connected to the sandwiching section, and has a fuel gas supply channel for supplying the fuel gas to the fuel gas channel. The fuel gas supply unit is connected to the first bridge. A fuel gas supply passage for supplying the fuel gas extends through the fuel gas supply unit in a stacking direction. The second bridge is connected to the sandwiching section, and has an exhaust fuel gas channel for discharging the fuel gas after consumption as an exhaust fuel gas from the fuel gas channel. The exhaust fuel gas discharge unit is connected to the second bridge, and has an exhaust fuel gas passage for allowing the exhaust fuel gas to flow in the stacking direction. The exhaust fuel gas discharge unit is connected to the fuel gas channel through the fuel gas supply passage.

Further, the present invention relates to a fuel cell module comprising a fuel cell stack placed in a casing. The fuel cell stack is formed by stacking a plurality of fuel cells each including an electrolyte electrode assembly and separators sandwiching the electrolyte electrode assembly. The electrolyte electrode assembly comprises an anode, a cathode, and an electrolyte interposed between the anode and the cathode.

A reformer for reforming a fuel to produce a fuel gas supplied to the anode, and an ejector connected to the reformer on an upstream side for returning the fuel gas after consumption as an exhaust fuel gas to the reformer are provided in the casing.

According to the present invention, the fuel gas used in the electrolyte electrode assembly is discharged as the exhaust fuel gas from the fuel gas channel to the exhaust fuel gas channel in the second bridge. Then, the fuel gas flows along the exhaust fuel gas passage in the stacking direction, and is supplied again as the fuel gas to the fuel gas channel through the fuel gas supply passage. In the structure, the unconsumed fuel gas remaining in the exhaust fuel gas can be utilized again, and improvement in the utilization ratio of the fuel gas is achieved suitably.

BEST MODE FOR CARRYING OUT THE INVENTION

Figure 1:
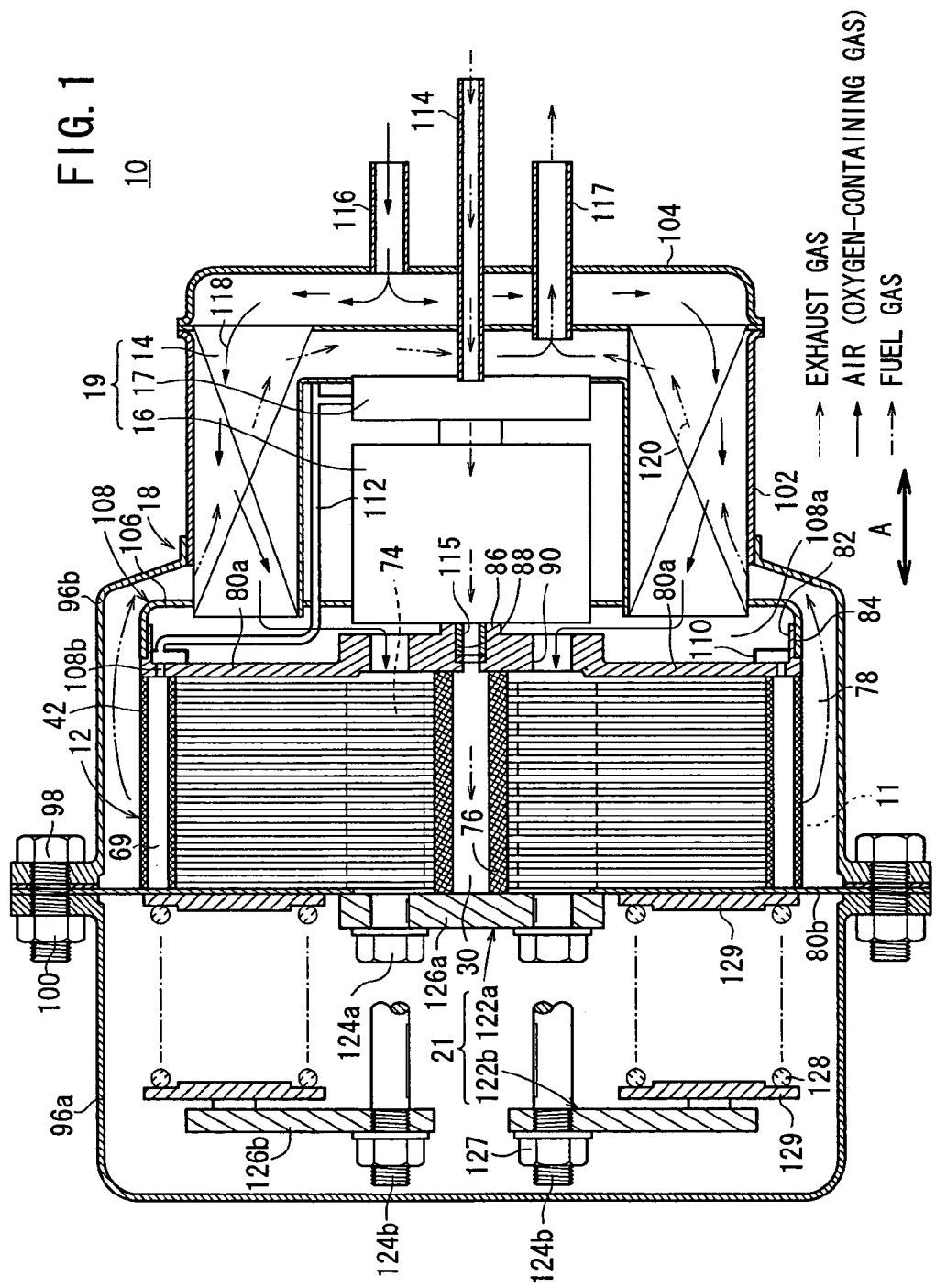
FIG. 1 is a partial cross sectional view showing a fuel cell module including fuel cells according to a first embodiment of the present invention.
Figure 2:
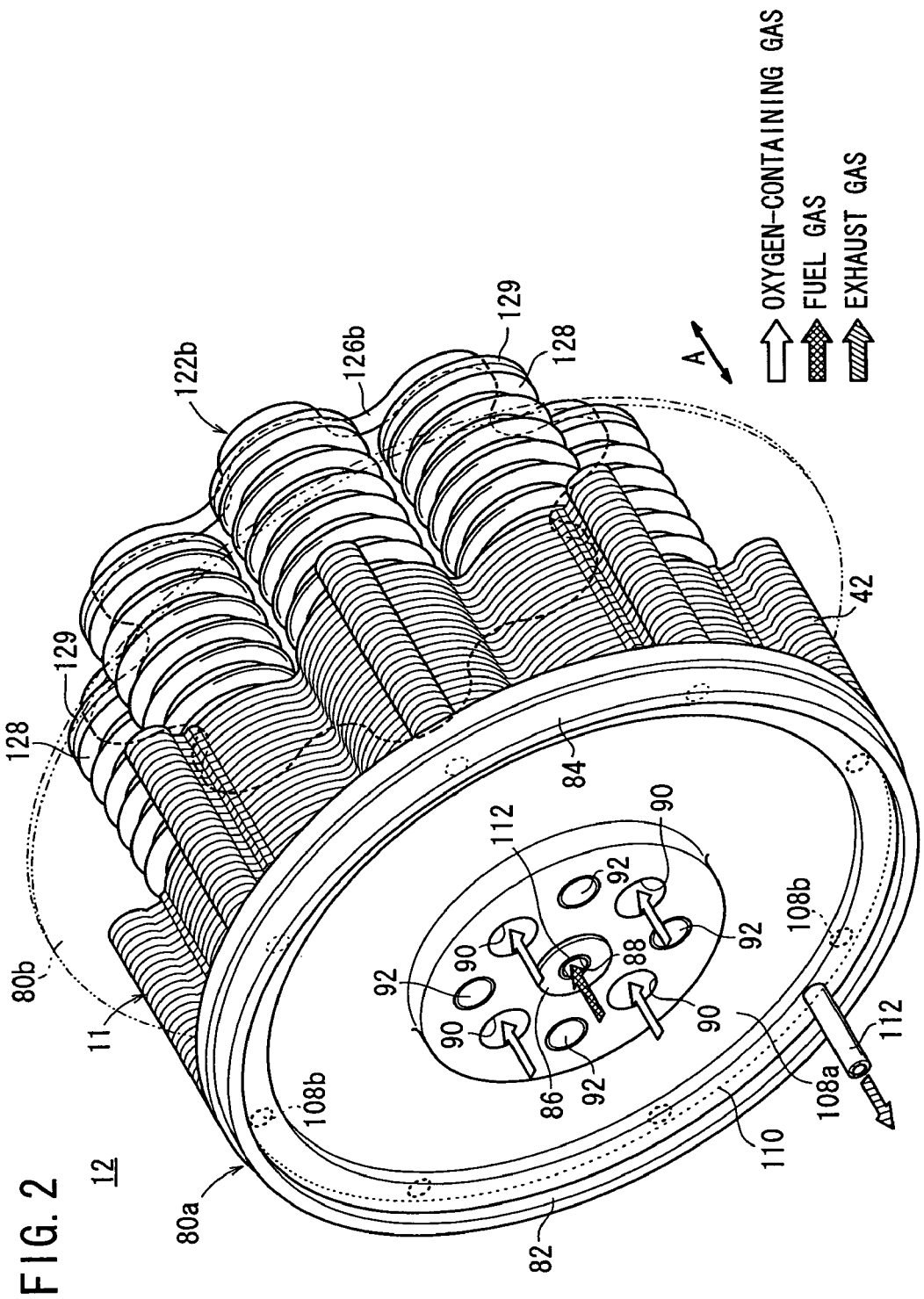
FIG. 2 is a perspective view schematically showing a fuel cell stack of the fuel cell module.

FIG. 1 is a partial cross sectional view showing a fuel cell module 10 including the fuel cells 11 according to a first embodiment of the present invention. FIG. 2 is a perspective view schematically showing a fuel cell stack 12 formed by stacking the fuel cells 11 in a direction indicated by an arrow A.

The fuel cell module 10 is used in various applications, including stationary and mobile applications. For example, the fuel cell module 10 is mounted on a vehicle. As shown in FIG. 1, the fuel cell module 10 includes a fuel cell stack 12, a heat exchanger 14, a reformer 16, an ejector 17, and a casing 18. The heat exchanger 14 heats an oxygen-containing gas before it is supplied to the fuel cell stack 12. The reformer 16 reforms a fuel to produce a fuel gas. The ejector 17 is provided on the upstream side of the reformer 16 for sucking an exhaust fuel gas as described later. The fuel cell stack 12, the heat exchanger 14, the reformer 16, and the ejector 17 are disposed in the casing 18.

In the casing 18, a fluid unit 19 including at least the heat exchanger 14, the reformer 16, and the ejector 17 is disposed on one side of the fuel cell stack 12, and a load applying mechanism 21 for applying a tightening load to the fuel cells 11 in the stacking direction indicated by the arrow A is disposed on the other side of the fuel cell stack 12. The fluid unit 19 and the load applying mechanism 21 are provided symmetrically with respect to the central axis of the fuel cell stack 12.

Figure 3:
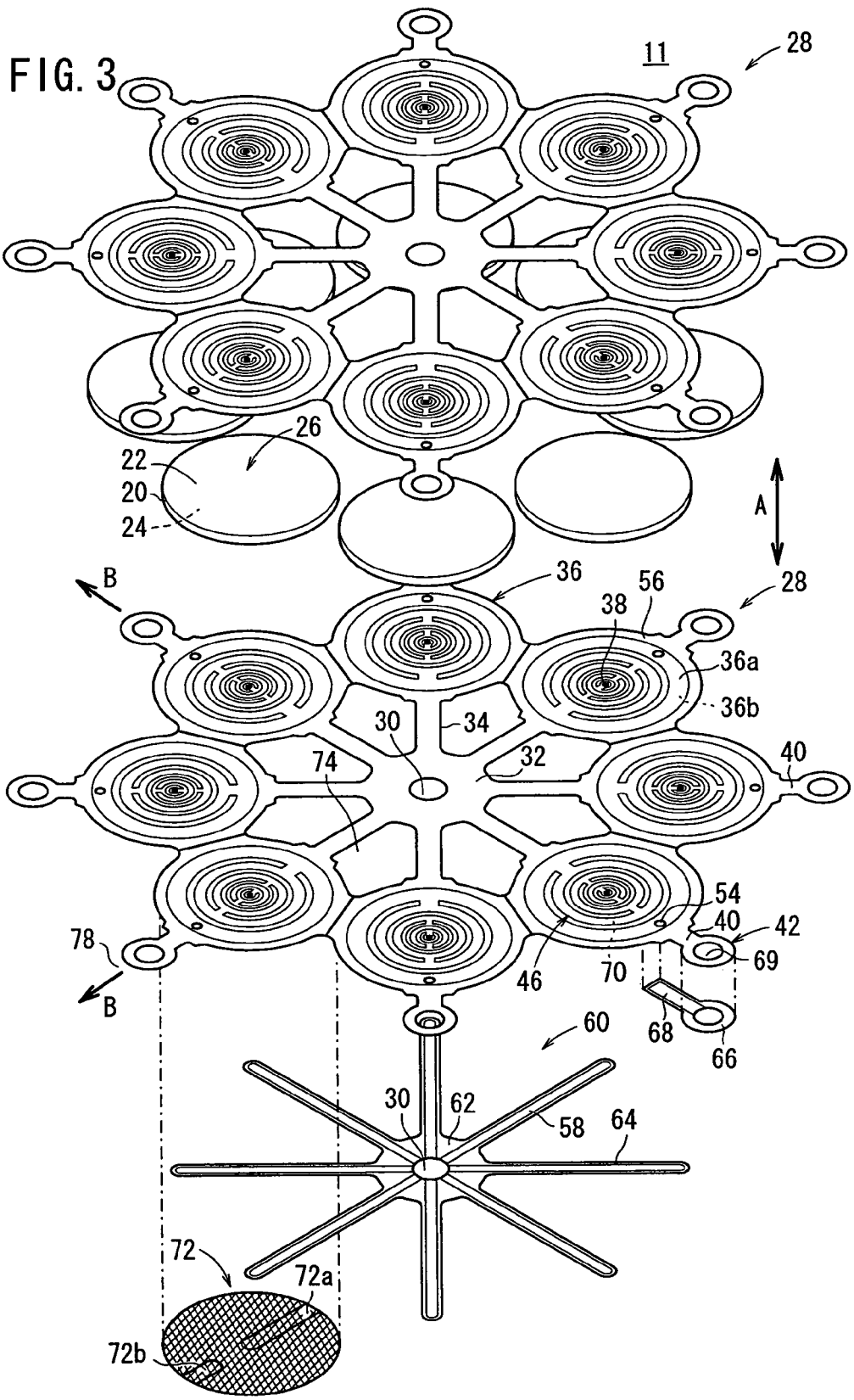
FIG. 3 is an exploded perspective view showing the fuel cell of the fuel cell stack.
Figure 4:
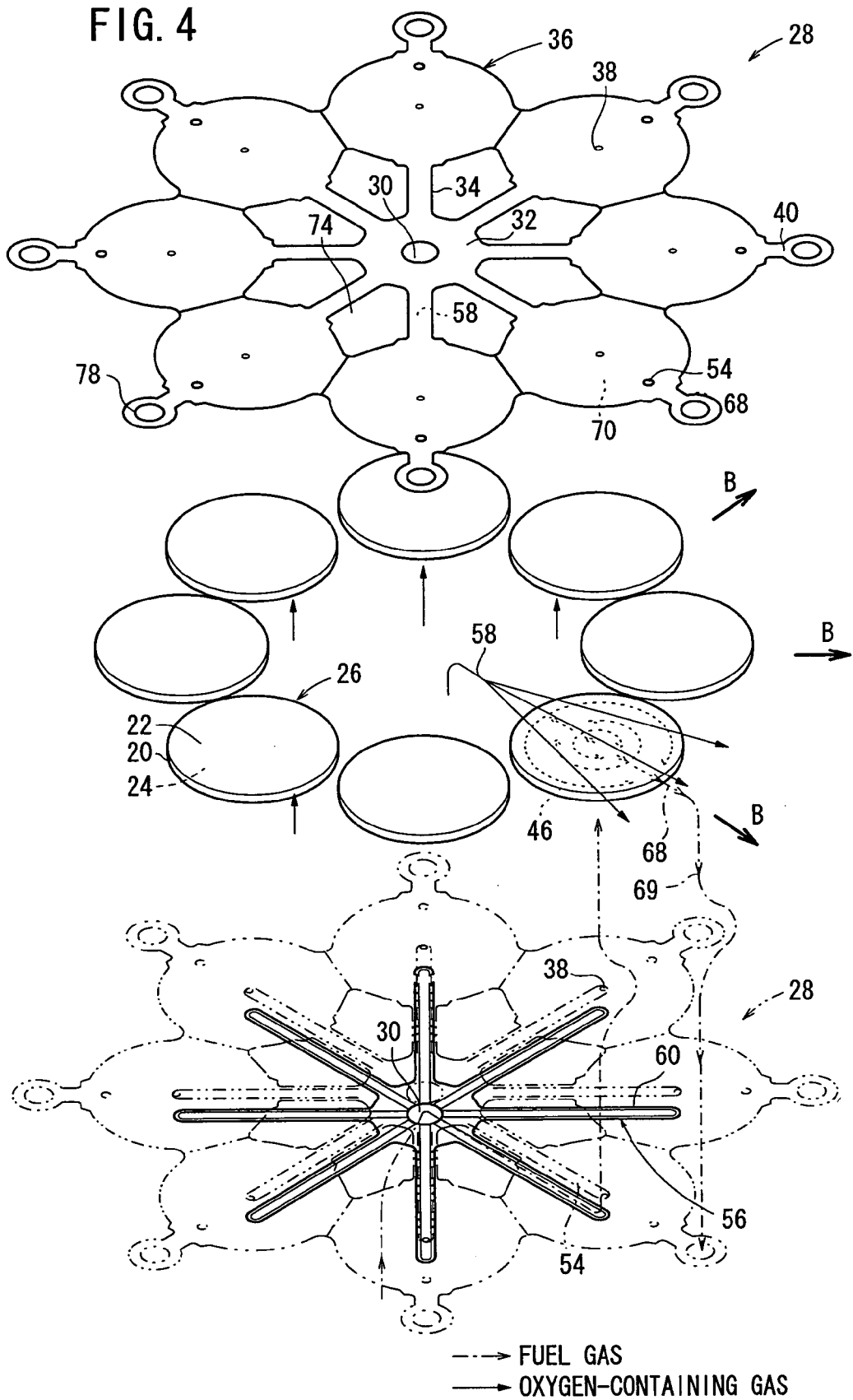
FIG. 4 is a partial exploded perspective view showing gas flows in the fuel cell.

The fuel cell 11 is a solid oxide fuel cell (SOFC). As shown in FIGS. 3 and 4, the fuel cell 11 includes electrolyte electrode assemblies 26 each having a circular disk shape. Each of the electrolyte electrode assemblies 26 includes a cathode 22, an anode 24, and an electrolyte (electrolyte plate) 20 interposed between the cathode 22 and the anode 24. A barrier layer (not shown) is provided at least at the outer circumferential edge of the electrolyte electrode assembly 26 for preventing the entry of the oxygen-containing gas and the fuel gas. For example, the electrolyte 20 is made of ion-conductive solid oxide such as stabilized zirconia.

A plurality of, e.g., eight electrolyte electrode assemblies 26 are sandwiched between a pair of separators 28 to form the fuel cell 11. The eight electrolyte electrode assemblies 26 are concentric with a fuel gas supply passage (fuel gas supply unit) 30 extending through the center of the separators 28.

In FIG. 3, for example, each of the separators 28 comprises a single metal plate of, e.g., stainless alloy or a carbon plate. The separator 28 has a fuel gas supply unit 32. The fuel gas supply passage 30 extends through the center of the first gas supply unit 32. The fuel gas supply unit 32 is integral with sandwiching sections 36 each having a relatively large diameter through a plurality of first bridges 34. The first bridges 34 extend radially outwardly from the fuel gas supply unit 32 at equal angles (intervals).

The sandwiching section 36 and the electrolyte electrode assembly 26 have substantially the same size. A fuel gas inlet 38 for supplying the fuel gas is provided, e.g., at the center, or at a position deviated from the center of the sandwiching section 36 toward the upstream side in the flow direction of the oxygen-containing gas. At the outer end of the sandwiching section 36 (outer circumference of the separator 28), a plate-like second bridge 40 protrudes outwardly in the direction indicated by an arrow B. An exhaust fuel gas discharge unit 42 is connected to the second bridge 40.

Figure 5:
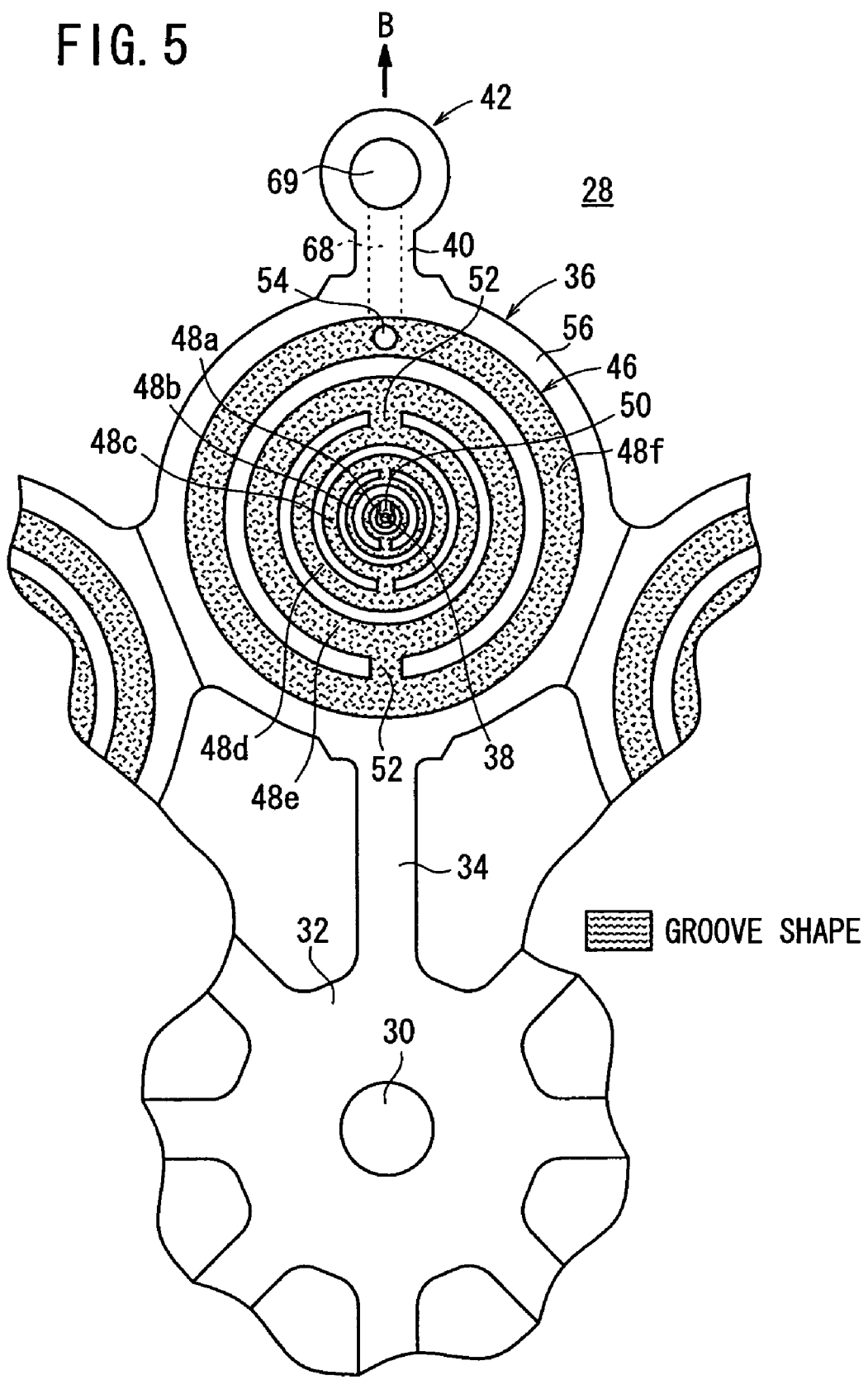
FIG. 5 is a partial enlarged view showing one surface of a separator.

Each of the sandwiching sections 36 has a fuel gas channel 46 for supplying the fuel gas along an electrode surface of the anode 24 on a surface 36a which contacts the anode 24. As shown in FIG. 5, the fuel gas channel 46 comprises a plurality of ring shaped grooves (channel unit) 48a to 48f formed concentrically around the fuel gas inlet 38 in the sandwiching section 36. The ring shaped groove 48a having the smallest diameter is connected to the fuel gas inlet 38 through a straight groove 50. From the ring shaped groove 48a having the smallest diameter, the diameters of the ring shaped grooves get larger toward the ring shaped groove 48f having the largest diameter. The ring shaped grooves 48a to 48f are connected through connection grooves 52 provided alternately on the front side and on the back side in the direction indicated by the arrow B.

Figure 6:
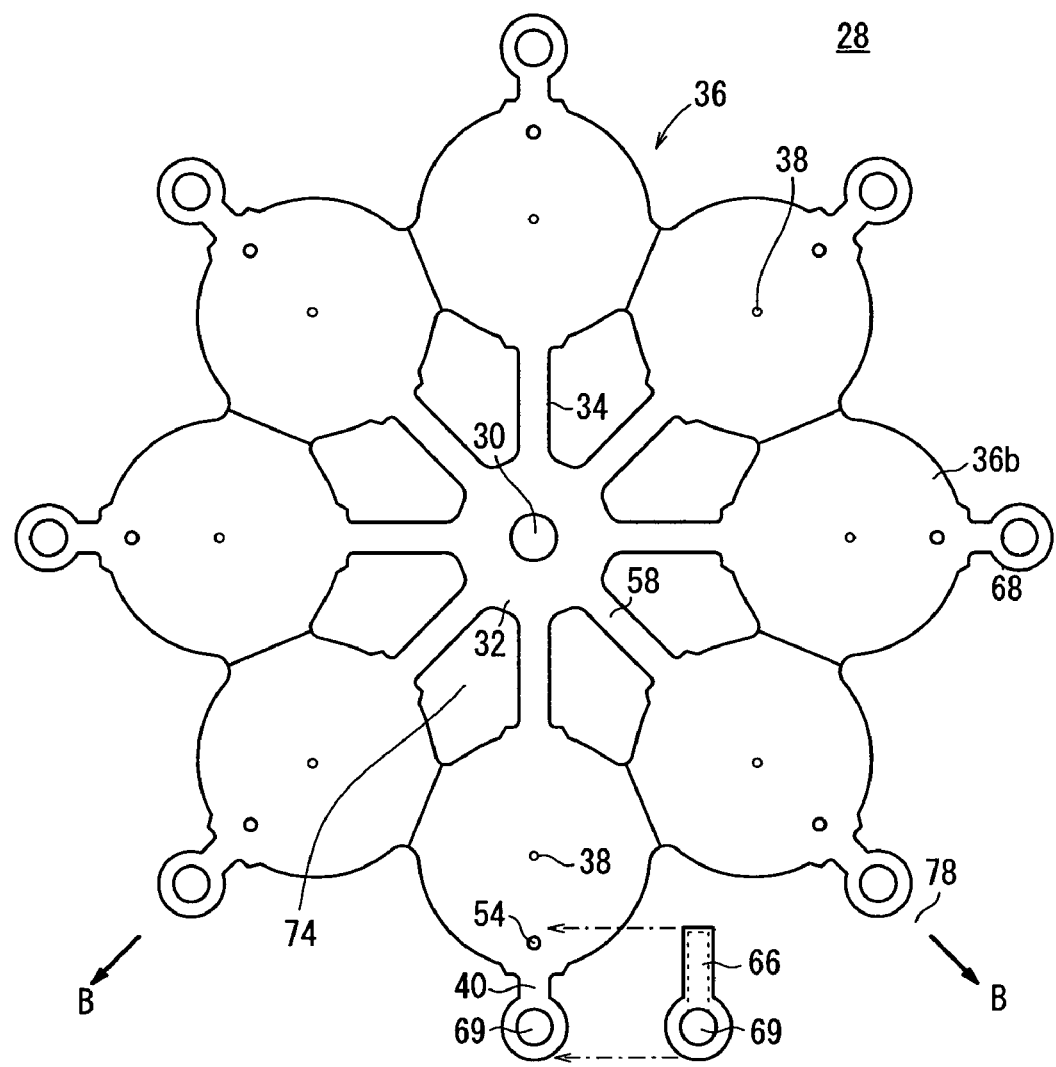
FIG. 6 is a view showing the other surface of the separator.

At the front end of the ring shaped groove 48f having the largest diameter in the direction indicated by the arrow B, a discharge hole (through hole) 54 is connected. From the fuel gas inlet 38, the ring shaped grooves 48a to 48f are connected to an exhaust fuel gas channel 68 as described later through the discharge hole 54. A ring shaped protrusion 56 is provided in the outer circumferential region of each of the sandwiching sections 36 such that the ring shaped protrusion 56 tightly contacts the outer circumferential region of the anode 24 of the electrolyte electrode assembly 26. As shown in FIG. 6, each of the sandwiching sections 36 has a planar surface 36b which electrically contacts the cathode 22.

As shown in FIG. 3, a channel member 60 is fixed to a surface of the separator 28 facing the cathode 22, e.g., by brazing, diffusion bonding, or laser welding. The channel member 60 has a planar shape. The channel member 60 has the fuel gas supply unit 62, and the fuel gas supply passage 30 extends through the center of the fuel gas supply unit 62. Eight third bridges 64 extend radially from the fuel gas supply unit 62. Each of the third bridges 64 is fixed to the separator 28 from the first bridge 34 to the surface 36b of the sandwiching section 36 to cover the fuel gas inlet 38 (see FIG. 7).

From the fuel gas supply unit 62 to the third bridge 64, a fuel gas supply channel 58 connecting the fuel gas supply passage 30 to the fuel gas inlet 38 is formed. For example, the fuel gas supply channel 58 is formed by, e.g., etching.

Figure 7:
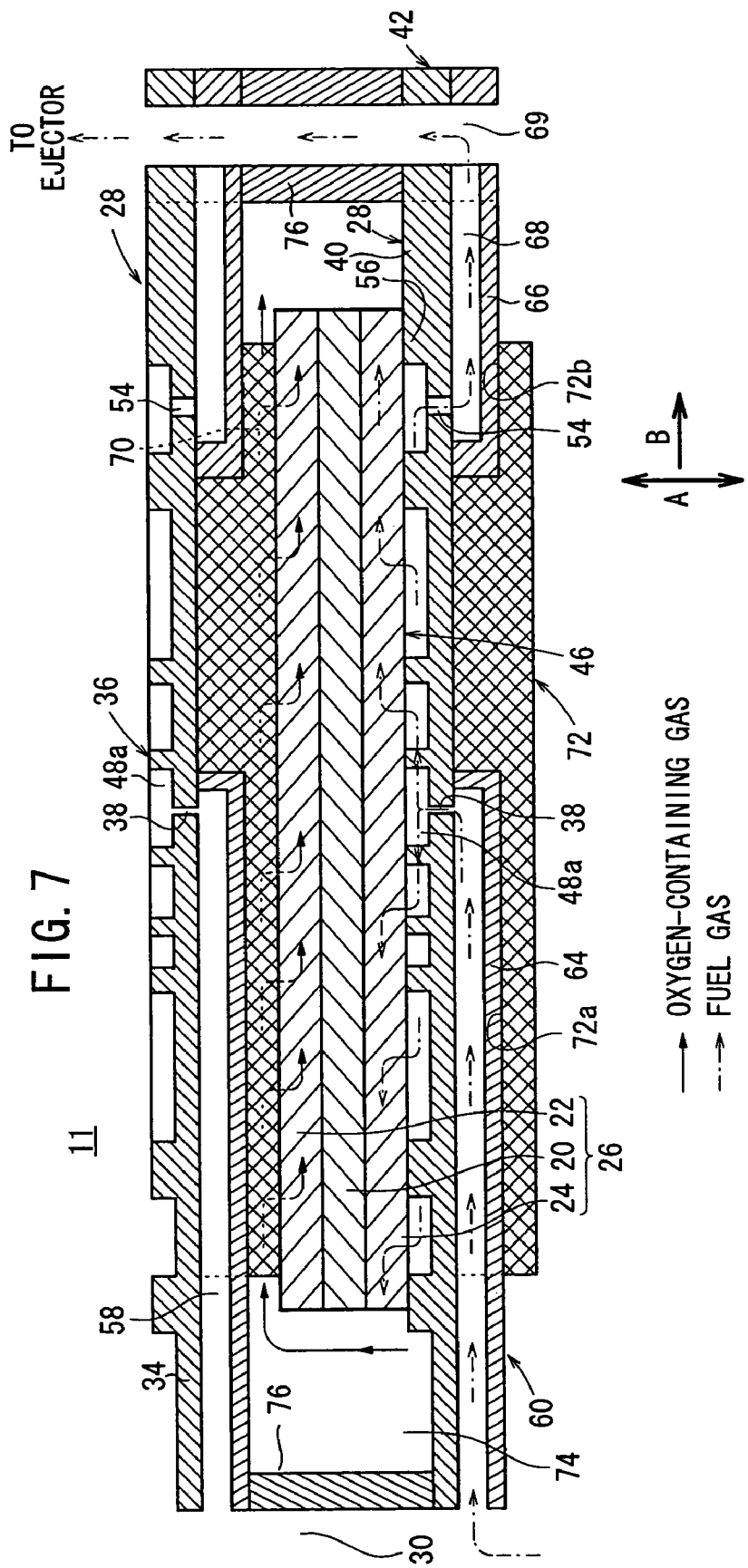
FIG. 7 is a cross sectional view showing operation of the fuel cell.

As shown in FIGS. 3 and 7, a discharge groove member 66 is fixed to a surface 36b of the sandwiching section 36 to cover the discharge hole 54, the second bridge 40, and the exhaust fuel gas discharge unit 42. The discharge groove member 66 has the exhaust fuel gas channel 68 connected to the discharge hole 54. An exhaust fuel gas passage 69 connected to the exhaust fuel gas channel 68 extends through the discharge groove member 66 and the ring shaped portion of the second bridge 40 in the stacking direction.

An elastic channel unit such as an electrically conductive mesh member 72 is provided on the surface 36b of the sandwiching section 36. The electrically conductive mesh member 72 forms an oxygen-containing gas channel 70 for supplying an oxygen-containing gas along an electrode surface of the cathode 22, and tightly contacts the cathode 22. Instead of the mesh member 72, it is possible to use a felt member, for example.

For example, the mesh member 72 is made of a wire rod material such as stainless steel (SUS material), and has a circular disk shape. The thickness of the mesh member 72 is dimensioned such that, when a load in a stacking direction indicated by an arrow A is applied to the mesh member 72, the mesh member 72 is deformed elastically desirably, and the mesh member 72 directly contacts the surface 36b of the sandwiching section 36. The mesh member 72 has cutouts 72a, 72b for providing spaces for the channel member 60 and the discharge groove member 66.

The oxygen-containing gas channel 70 provided in the mesh member 72 is connected to the oxygen-containing gas supply passage 74 for supplying the oxygen-containing gas from a space between an inner circumferential edge of the electrolyte electrode assembly 26 and an inner circumferential edge of the sandwiching section 36 in a direction indicated by an arrow B. The oxygen-containing gas supply passage 74 extends in the stacking direction indicated by the arrow A, among the sandwiching sections 36 and the respective first bridges 34.

Insulating seals 76 are provided between the separators 28 for sealing the fuel gas supply passage 30 and the exhaust fuel gas passage 69. For example, each of the insulating seals 76 is made of mica material, or ceramic material. An exhaust gas channel 78 is formed around the sandwiching sections 36 of the fuel cells 11.

As shown in FIGS. 1 and 2, the fuel cell stack 12 includes a plurality of the fuel cells 11 stacked together, and end plates 80a, 80b provided at opposite ends in the stacking direction.

Each of the end plates 80a, 80b has a substantially circular disk shape. A ring shaped portion 82 protrudes from the outer circumferential end of the end plate 80a, and a groove 84 is formed around the ring shaped portion 82. A columnar projection 86 is formed at the center of the ring shaped portion 82. The columnar projection 86 protrudes in the same direction as the ring shaped portion 82. A stepped hole 88 is formed at the center of the projection 86.

Holes 90 and screw holes 92 are formed in a same virtual circle around the projection 86. The holes 90 and the screw holes 92 are arranged alternately, and spaced at predetermined angles (intervals). The holes 90 and the screw holes 92 are provided at positions corresponding to the spaces of the oxygen-containing gas supply passages 74 formed between the first and third bridges 34, 64. The diameter of the end plate 80b is larger than the diameter of the end plate 80a. The end plate 80b is formed of a conductive thin plate.

The casing 18 includes a first case unit 96a containing the load applying mechanism 21 and a second case unit 96b containing the fuel cell stack 12. The end plate 80b and an insulating member are sandwiched between the first case unit 96a and the second case unit 96b. The insulating member is provided on the side of the second case unit 96b. The joint portion between the first case unit 96a and the second case unit 96b is tightened by screws 98 and nuts 100. The end plate 80b functions as a gas barrier for preventing entry of the hot exhaust gas or the hot air from the fluid unit 19 into the load applying mechanism 21.

An end of a ring shaped wall plate 102 is joined to the second case unit 96b, and a head plate 104 is fixed to the other end of the wall plate 102. The fluid unit 19 is provided symmetrically with respect to the central axis of the fuel cell stack 12. Specifically, the ejector 17 and the substantially cylindrical reformer 16 are provided coaxially inside the substantially ring shaped heat exchanger 14.

A wall plate 106 is fixed to the groove 84 around the end plate 80a to form a flow path member 108. The heat exchanger 14 and the reformer 16 are directly connected to the flow path member 108. A chamber 108a is formed in the flow path member 108, and the air heated at the heat exchanger 14 is temporally filled in the chamber 108a. The holes 90 are openings for supplying the air temporally filled in the chamber 108a to the fuel cell stack 12.

The flow path member 108 has a substantially ring shaped casing 110 corresponding to the exhaust fuel gas passages 69 formed integrally with the respective exhaust gas discharge units 42 of the fuel cell stack 12. The flow path member 108 has a plurality of holes 108b connected to the exhaust fuel gas passages 69, and the holes 108b form an exhaust fuel gas chamber connected into the casing 110. A predetermined number of, e.g., one pipe 112 is connected to the casing 110. The pipe 112 is connected to a sucking port of the ejector 17.

A fuel gas supply pipe 114 is connected to the ejector 17, and a reformed gas supply pipe 115 is connected to the reformer 16. The fuel gas supply pipe 114 extends to the outside from the head plate 104. The reformed gas supply pipe 115 is inserted into the stepped hole 88 of the end plate 80a, and connected to the fuel gas supply passage 30.

An air supply pipe 116 and an exhaust gas pipe 117 are connected to the head plate 104. A channel 118 extending from the air supply pipe 116, and directly opened to the flow path member 108 through the heat exchanger 14, and a channel 120 extending from the exhaust gas channel 78 of the fuel cell stack 12 to the exhaust gas pipe 117 through the heat exchanger 14 are provided in the casing 18.

The load applying mechanism 21 includes a first tightening unit 122a for applying a first tightening load T1 to a region around (near) the fuel gas supply passage 30 and a second tightening unit 122*b* for applying a second tightening load T2 to the electrolyte electrode assemblies 26. The second tightening load T2 is smaller than the first tightening load T1 (T1>T2).

The first tightening unit 122*a* includes short first tightening bolts 124*a* screwed into the screw holes 92 formed along one diagonal line of the end plate 80*a*. The first tightening bolts 124*a* extend in the stacking direction of the fuel cells 11, and engage a first presser plate 126*a*. The first tightening bolts 124*a* are provided in the oxygen-containing gas supply passage 74 extending through the separators 28. The first presser plate 126*a* is a narrow plate, and engages the central position of the separator 28 to cover the fuel gas supply passage 30.

The second tightening unit 122*b* includes long second tightening bolts 124*b* screwed into screw holes 92 formed along the other diagonal line of the end plate 80*a*. Ends of the second tightening bolts 124*b* extend through a second presser plate 126*b* having a curved outer section. Nuts 127 are fitted to the ends of the second tightening bolts 124*b*. The second tightening bolts 124*b* are provided in the oxygen-containing gas supply passage 74 extending through the separators 28. Springs 128 and spring seats 129 are provided in respective circular portions of the second presser plate 126*b*, at positions corresponding to the electrolyte electrode assemblies 26 on the sandwiching sections 36 of the fuel cell 11. For example, the springs 128 are ceramics springs.

Next, operation of the fuel cell module 10 will be described below.

In the fuel cell module 10, as shown in FIG. 1, a fuel (methane, ethane, propane, or the like) and, as necessary, water are supplied from the fuel gas supply pipe 114, and an oxygen-containing gas (hereinafter referred to as the "air") is supplied from the air supply pipe 116.

The fuel from the ejector 17 is reformed when it passes through the reformer 16 to produce a fuel gas (hydrogen-containing gas). The fuel gas is supplied to the fuel gas supply passage 30 of the fuel cell stack 12. The fuel gas moves in the stacking direction indicated by the arrow A, and flows into the fuel gas supply channel 58 through the separator 28 of each fuel cell 11 (see FIG. 7).

The fuel gas flows along the fuel gas supply channel 58 between the first and third bridges 34, 64, and flows into the fuel gas inlets 38 of the sandwiching sections 36. Thus, the fuel gas is supplied to the fuel gas channel 46 on each of the sandwiching sections 36. The fuel gas inlets 38 are formed at positions corresponding to substantially the central positions of the anodes 24 of the electrolyte electrode assemblies 26. Thus, the fuel gas is supplied from the fuel gas inlets 38 to substantially the central regions of the anodes 24, and flows outwardly from the central regions of the anodes 24 along the fuel gas channel 46.

Specifically, as shown in FIG. 5, the fuel gas channel 46 includes a plurality of ring shaped grooves 48*a* to 48*f*. Firstly, the fuel gas is supplied to the ring shaped groove 48*a* through the straight groove 50 connected to the fuel gas inlet 38. After the fuel gas flows through the ring shaped groove 48*a*, the fuel gas flows outwardly temporarily through the connection groove 52, and is supplied to the ring shaped groove 48*b* outside the ring shaped groove 48*a*. Thus, the fuel gas flows along the ring shaped groove 48*b*.

Further, the fuel gas supplied to the ring shaped groove 48*c* outside the ring shaped groove 48*b* through the connection groove 52 flows along the ring shaped grooves 48*d* to 48*f* through the connection groove 52 until it reaches the discharge hole 54. Therefore, the fuel gas is supplied outwardly from the substantially center of the anode 24, and the fuel gas after consumption is discharged to the discharge hole 54.

As shown in FIG. 7, the consumed fuel gas discharged to the discharge hole 54 moves toward the surface 36*b*, and flows along the exhaust fuel gas channel 68 in the direction indicated by the arrow B. The fuel gas is discharged as an exhaust fuel gas into the exhaust fuel gas passage 69. As shown in FIG. 1, the exhaust fuel gas flows along each exhaust fuel gas passage 69 in the direction indicated by the arrow A. Then, the fuel gas flows into the casing 110 from the hole 108*b* connected to the exhaust fuel gas passage 69.

The pipe 112 is connected to the casing 110. The exhaust fuel gas flows through the pipe 112, and is sucked to the sucking port of the ejector 17. Therefore, the exhaust fuel gas sucked by the ejector 17 is mixed with a fresh fuel, and then, supplied to the reformer 16.

As shown in FIG. 1, the air from the air supply pipe 116 flows through the channel 118 of the heat exchanger 14, and temporarily flows into the chamber 108*a*. The air flows through the holes 90 connected to the chamber 108*a*, and is supplied to the oxygen-containing gas supply passage 74 provided at substantially the central region of the fuel cells 11. At this time, in the heat exchanger 14, as described later, since the exhaust gas discharged to the exhaust gas channel 78 flows through the channel 120, heat exchange between the air before supplied to the fuel cells 11 and the exhaust gas is performed. Therefore, the air is heated to a desired fuel cell operating temperature beforehand.

The air supplied to the oxygen-containing gas supply passage 74 flows into the space between the inner circumferential edge of the electrolyte electrode assembly 26 and the inner circumferential edge of the sandwiching section 36 in the direction indicated by the arrow B, and flows toward the oxygen-containing gas channel 70 formed by the mesh member 72. As shown in FIG. 7, in the oxygen-containing gas channel 70, the oxygen-containing gas flows from the inner circumferential edge (central region of the separator 28) to the outer circumferential edge (outer region of the separator 28) of, i.e., from one end to the other end of the outer circumferential region of the cathode 22 of the electrolyte electrode assembly 26.

Thus, in the electrolyte electrode assembly 26, the fuel gas flows from the central region to the outer circumferential region of the anode 24, and the air flows in one direction indicted by the arrow B along the electrode surface of the cathode 22. At this time, oxide ions flow through the electrolyte 20 toward the anode 24 for generating electricity by electrochemical reactions.

The air and the fuel gas discharged to the outside of the respective electrolyte electrode assemblies 26 as an exhaust gas flows through the exhaust gas channel 78 in the stacking direction. When the exhaust gas flows through the channel 120 of the heat exchanger 14, heat exchange between the exhaust gas and the air is carried out. Then, the exhaust gas is discharged into the exhaust gas pipe 117 (see FIG. 1).

In the first embodiment, as shown in FIG. 7, some of the fuel gas consumed in the reaction of the electrolyte electrode assembly 26 is discharged as the exhaust fuel gas from the fuel gas channel 46 to the exhaust fuel gas channel 68 of the second bridge 40 through the discharge hole 54. The exhaust fuel gas flows through the exhaust fuel gas channel 68 in the direction indicated by the arrow B, and then, the exhaust fuel gas flows along the exhaust fuel gas passage 69 formed in the fuel gas discharge unit 42.

Then, as shown in FIG. 1, the exhaust fuel gas flows through the pipe 112, and then, the fuel gas is sucked to the ejector 17. The exhaust fuel gas flows from the ejector 17 to the reformer 16, and then, the exhaust fuel gas is supplied again from the reformer 16 to the fuel cell stack 12.

Thus, in the first embodiment, the unconsumed fuel gas remaining in the exhaust fuel gas can be utilized again as the fuel gas, and improvement in the utilization ratio of the fuel gas is achieved advantageously.

Further, the ejector 17 is connected to the upstream side of the reformer 16, and the exhaust fuel gas passage 69 of the fuel cell stack 12 is connected to the ejector 17 through the pipe 112. Therefore, the ejector 17 utilizes the negative pressure to suck the exhaust gas from the exhaust fuel gas passage 69. Thus, the load such as the pump becomes unnecessary, and the effective utilization of the fuel gas is achieved further efficiently and economically.

Further, the fuel gas channel 46 has the ring shaped grooves 48a to 48f connected to the exhaust fuel gas channel 68. In the structure, it is possible to effectively collect the exhaust fuel gas from the fuel gas channel 46, and reutilization of the fuel gas is simplified.

Further, the ring shaped protrusion 56 is formed on the surface of the separator 28 facing the anode 24, and the ring shaped protrusion 56 tightly contacts the outer circumferential region of the anode 24. In the structure, it is possible to prevent entry of the exhaust gas from the outer circumferential region of the anode 24. In the seal-less structure, it is possible to reliably prevent the anode 24 from being deteriorated due to oxidation.

In the first embodiment, the fuel gas channel 46 includes a plurality of ring shaped grooves 48a to 48f concentrically arranged with each other and the connection grooves 52 connecting the ring shaped grooves 48a to 48f at opposite positions. However, the present invention is not limited in this respect. Various shapes can be adopted. For example, the grooves may have a spiral shape.

Figure 8:
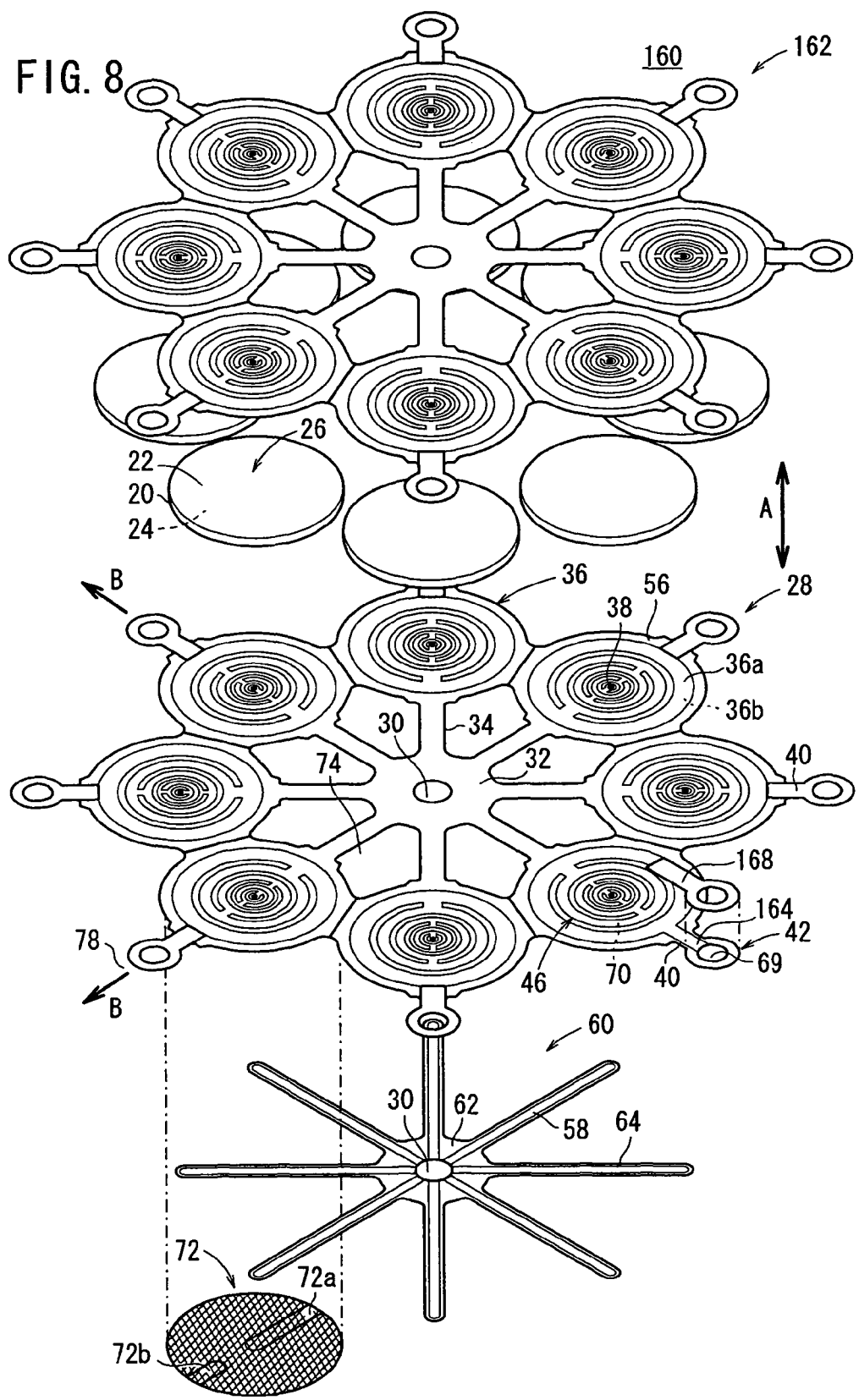
FIG. 8 is an exploded perspective view showing a fuel cell according to a second embodiment of the present invention.

FIG. 8 is an exploded perspective view showing a fuel cell 160 according to a second embodiment of the present invention. The constituent elements that are identical to those of the fuel cell 11 according to the first embodiment are labeled with the same reference numeral, and description thereof will be omitted. Also in third and fourth embodiments as described later, the constituent elements that are identical to those of the fuel cell 11 according to the first embodiment are labeled with the same reference numeral, and description thereof will be omitted.

Figure 9:
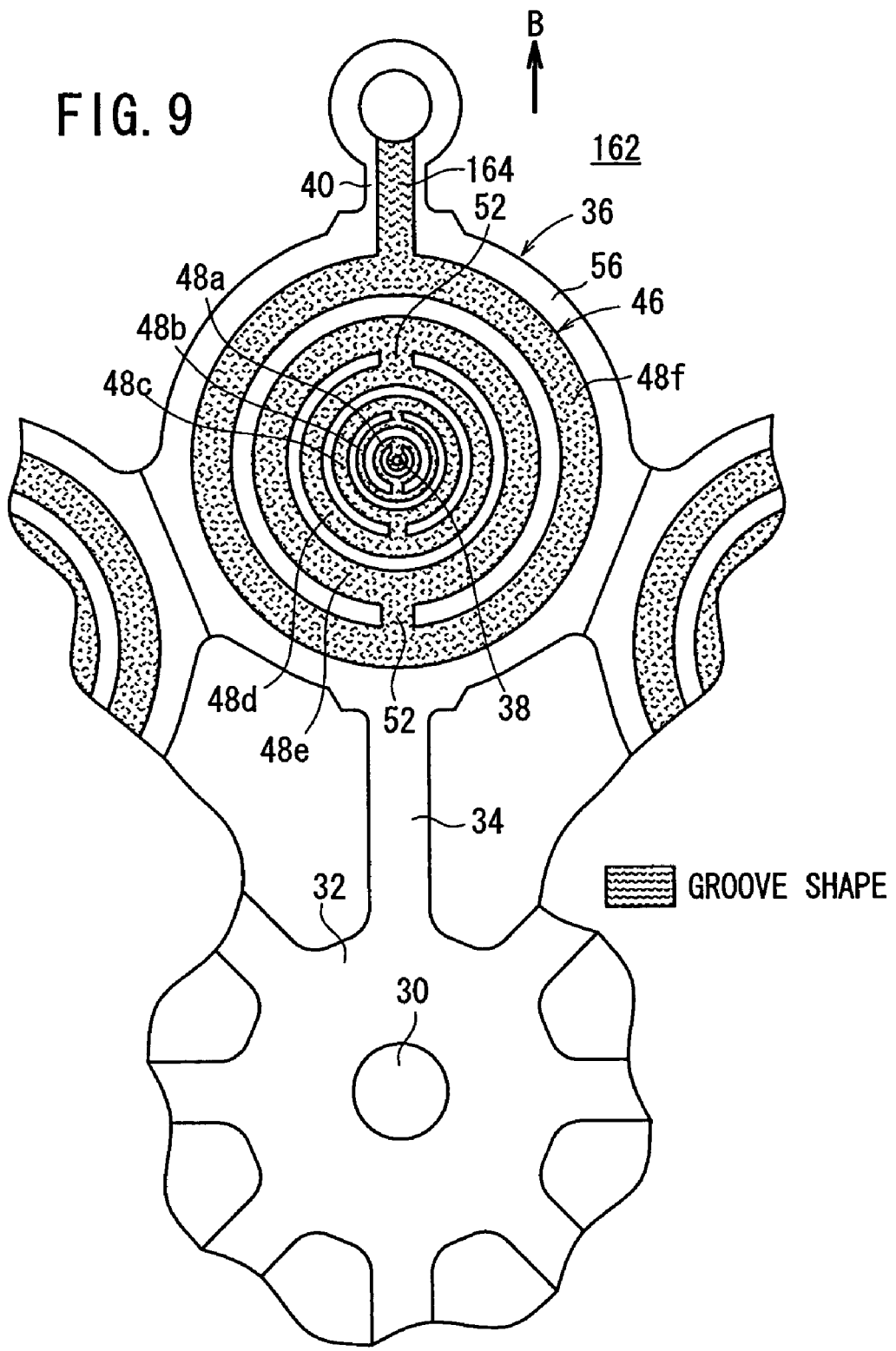
FIG. 9 is a partial enlarged view showing one surface of the separator.

The fuel cell 160 has a separator 162, and the separator 162 has an exhaust fuel gas channel 164 on a surface of the second bridge 40 facing the anode 24. As shown in FIGS. 8 and 9, the exhaust fuel gas channel 164 is provided in a region extending from the second bridge 40 to the exhaust fuel gas discharge unit 42, corresponding to the surface 36a of each sandwiching section 36. A lid member 168 is fixed to cover the second bridge 40 and the exhaust fuel gas discharge unit 42. The fuel gas channel 46 is directly connected to the exhaust fuel gas channel 164, and the discharge holes 54 of the first embodiment can be eliminated.

Figure 10:
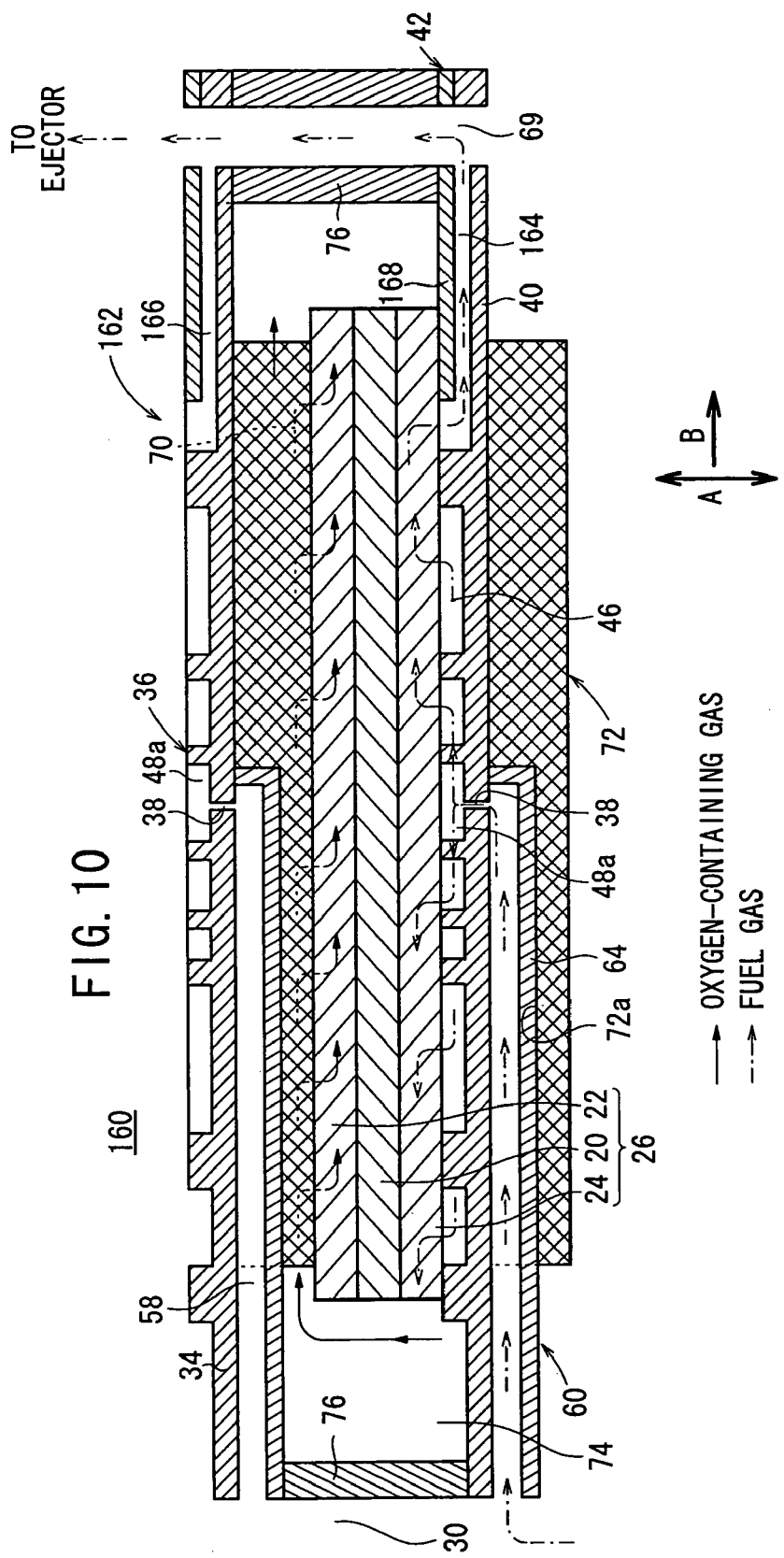
FIG. 10 is a cross sectional view schematically showing operation of the fuel cell.

In the second embodiment, as shown in FIG. 10, the fuel gas flows through the fuel gas channel 46, and supplied to the anode 24 of the electrolyte electrode assembly 26. After the fuel gas is consumed at the anode 24, the fuel gas is discharged as the exhaust fuel gas into the exhaust fuel gas channel 164 provided at a position near the outer circumferential portion of the anode 24. Then, the exhaust fuel gas moves along the exhaust fuel gas channel 164 in the direction indicated by the arrow B, and flows through the exhaust fuel gas passage 69. Thus, the exhaust fuel gas is discharged in the stacking direction.

Therefore, the consumed fuel gas is sucked to the ejector (not shown), and returned to the fuel gas supply passage 30 as the fuel gas newly supplied to the fuel cells 160. In the structure, the same advantages as in the first embodiment can be obtained. For example, the unconsumed fuel gas is utilized again suitably, and improvement in the utilization ratio of the fuel gas is achieved.

In the first and second embodiments, the air as the oxygen-containing gas is supplied outwardly from the central region of the separators 28, 162. Alternatively, the air may be supplied from the outside of the separators 28, 162 to the center of the separators 28, 162.

Figure 11:
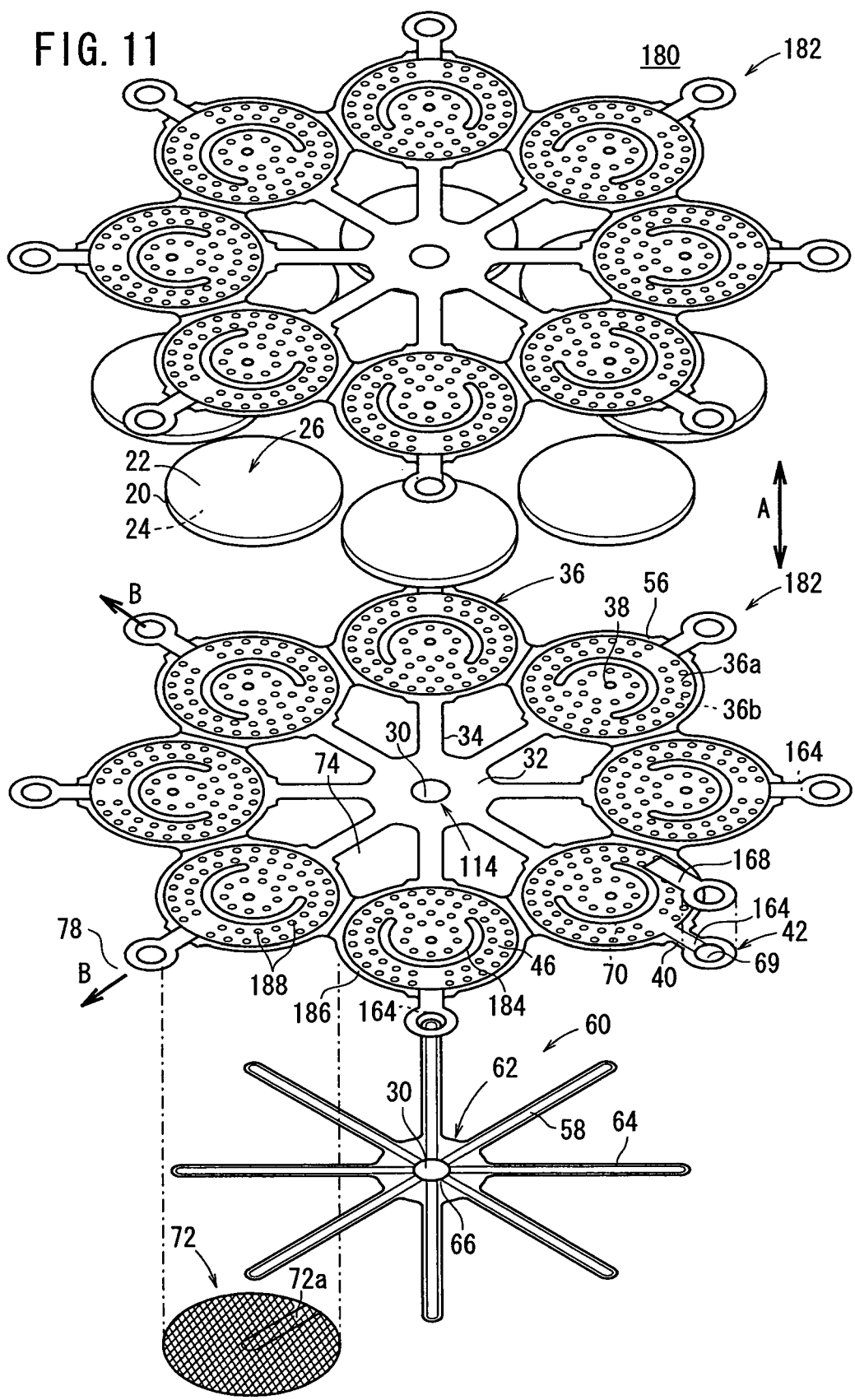
FIG. 11 is an exploded perspective view showing a fuel cell according to a third embodiment of the present invention.

FIG. 11 is an exploded perspective view showing a fuel cell 180 according to a third embodiment of the present invention.

The fuel cell 180 has a separator 182, and an exhaust fuel gas channel 164 and a circular arc wall 184 are provided on the surface 36a of each sandwiching section 36 of the separator 182. The fuel gas consumed when it passes through the fuel gas channel 46 is discharged through the exhaust fuel gas channel 164. The circular arc wall 184 directly contacts the anode 24, and forms a detour path to prevent the fuel gas from flowing straight from the fuel gas inlet 38 to the exhaust fuel gas channel 164.

The circular arc wall 184 has a substantially horseshoe shape. The fuel gas inlet 38 is provided at a position surrounded by the circular arc wall 184, and the exhaust fuel gas channel 164 is spaced outwardly from the outer region outside the circular arc wall 184. On the surface 36a, an annular protrusion 186 and a plurality of projections 188 are provided. The annular protrusion 186 protrudes on the side of the fuel gas channel 46 formed, and contacts the outer edge of the anode 24, and the projections 188 contact the anode 24.

The protrusion 186 has a substantially ring shape with partial cutaway at a position corresponding to the exhaust fuel gas channel 164. The projections 188 are made of solid portions formed by, e.g., etching, or hollow portions formed by pressure forming.

The cross sectional shape of the projection 188 may take various shapes such as a rectangular shape, a circular shape, an oval shape, an ellipse shape, a triangular shape or a square shape. The position and density of the projection 188 can be changed arbitrarily depending on the flow state of the fuel gas or the like.

Figure 12:
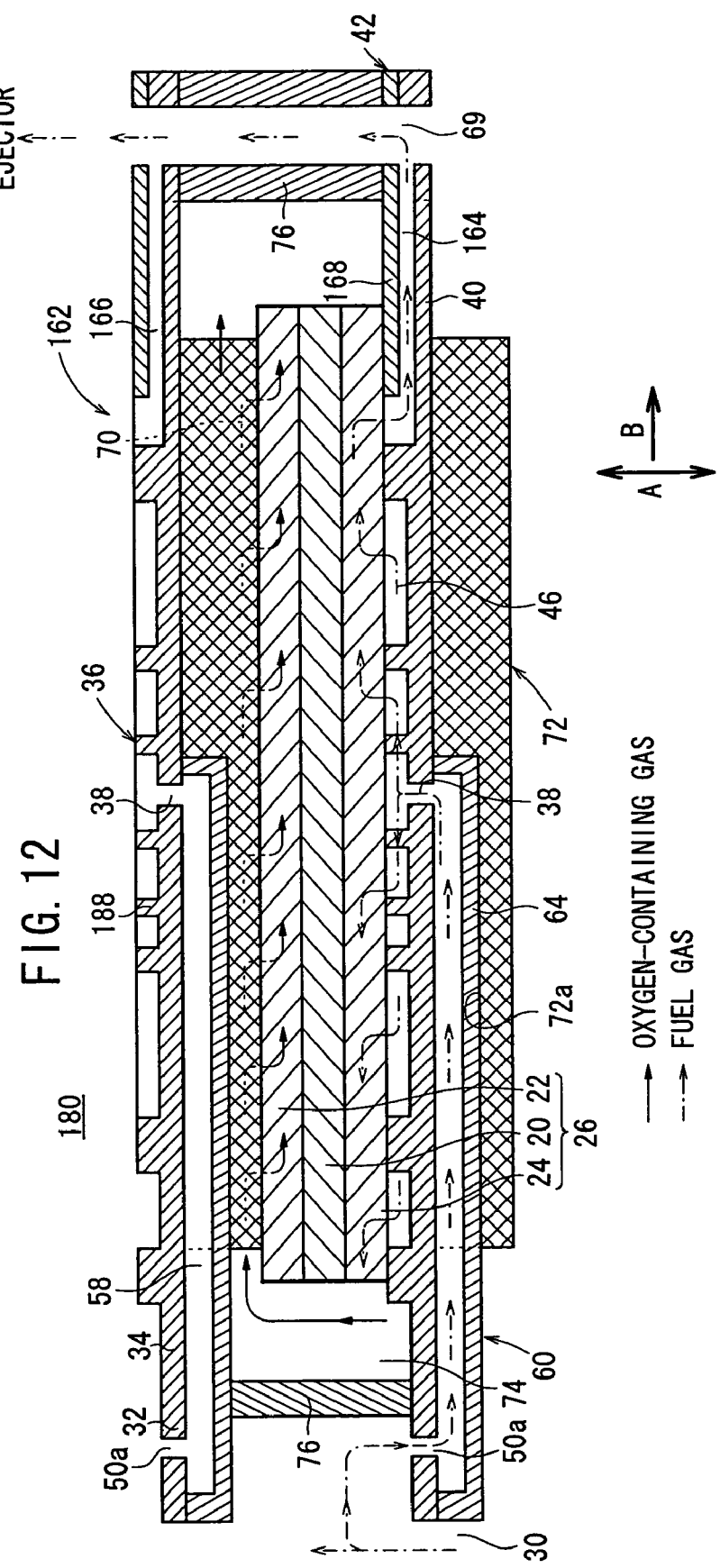
FIG. 12 is a cross sectional view schematically showing operation of the fuel cell.

In the fuel cell 180, as shown in FIG. 12, the fuel gas moving in the stacking direction along the fuel gas supply passage 30 is supplied to the fuel gas supply channel 58. Then, the fuel gas flows through the fuel gas supply channel 58 in the direction indicated by the arrow B, and is supplied through the fuel gas inlet 38 to the fuel gas channel 46.

As shown in FIG. 11, in the fuel gas channel 46, the circular arc wall 184 is provided between the fuel gas inlet 38 and the exhaust fuel gas channel 164. In the structure, the fuel gas supplied to the fuel gas channel 46 is blocked by the circular arc wall 184, and the fuel gas does not flow straight from the fuel gas inlet 38 to the exhaust fuel gas channel 164. The fuel gas is supplied suitably along the anode 24.

Figure 13:
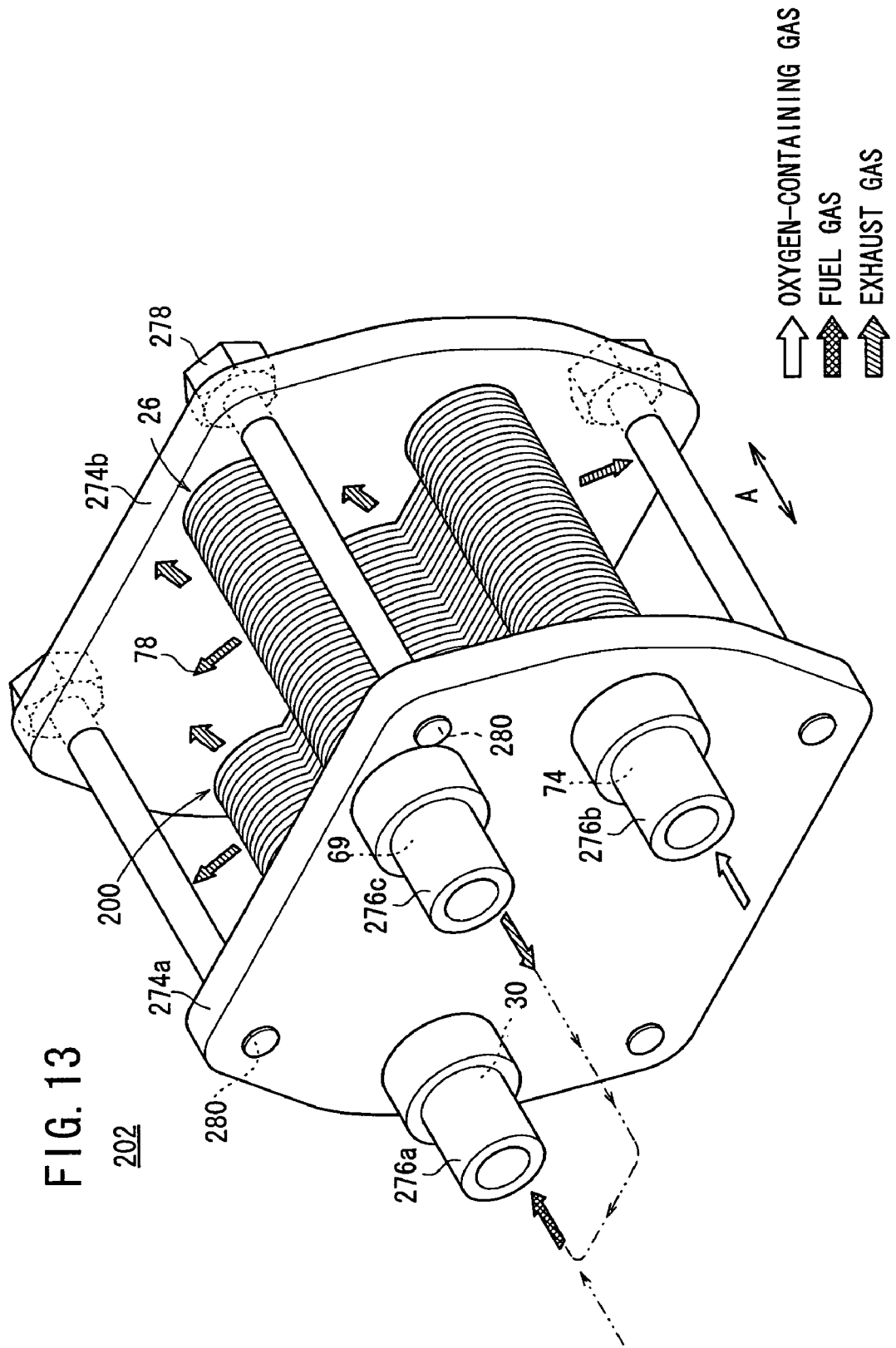
FIG. 13 is a perspective view schematically showing a fuel cell stack formed by stacking a plurality of fuel cells according to a fourth embodiment of the present invention.

FIG. 13 is a perspective view schematically showing a fuel cell stack 202 formed by stacking a plurality of fuel cells 200 according to a fourth embodiment in a stacking direction indicated by an arrow A.

Figure 14:
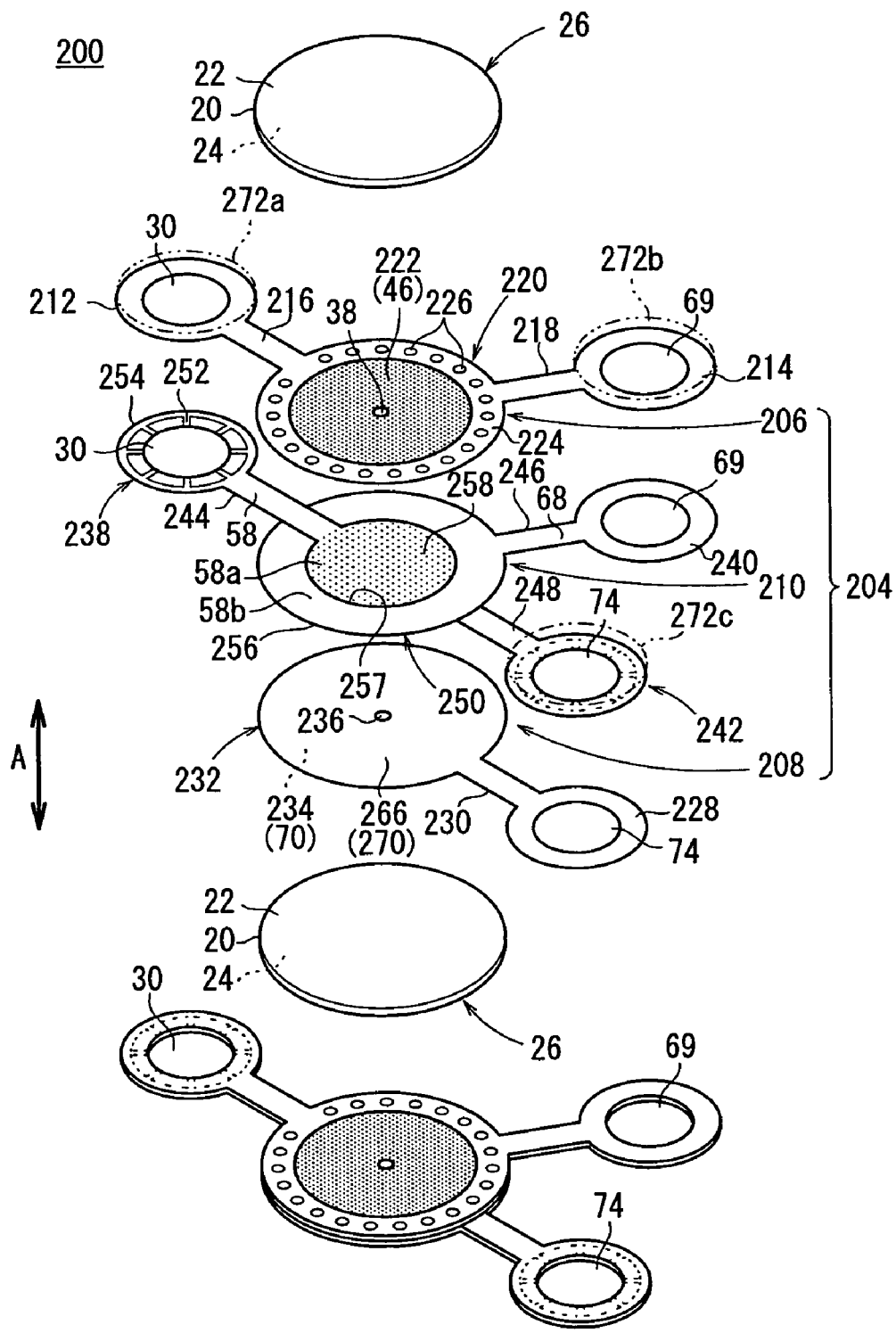
FIG. 14 is an exploded perspective view showing the fuel cell.
Figure 15:
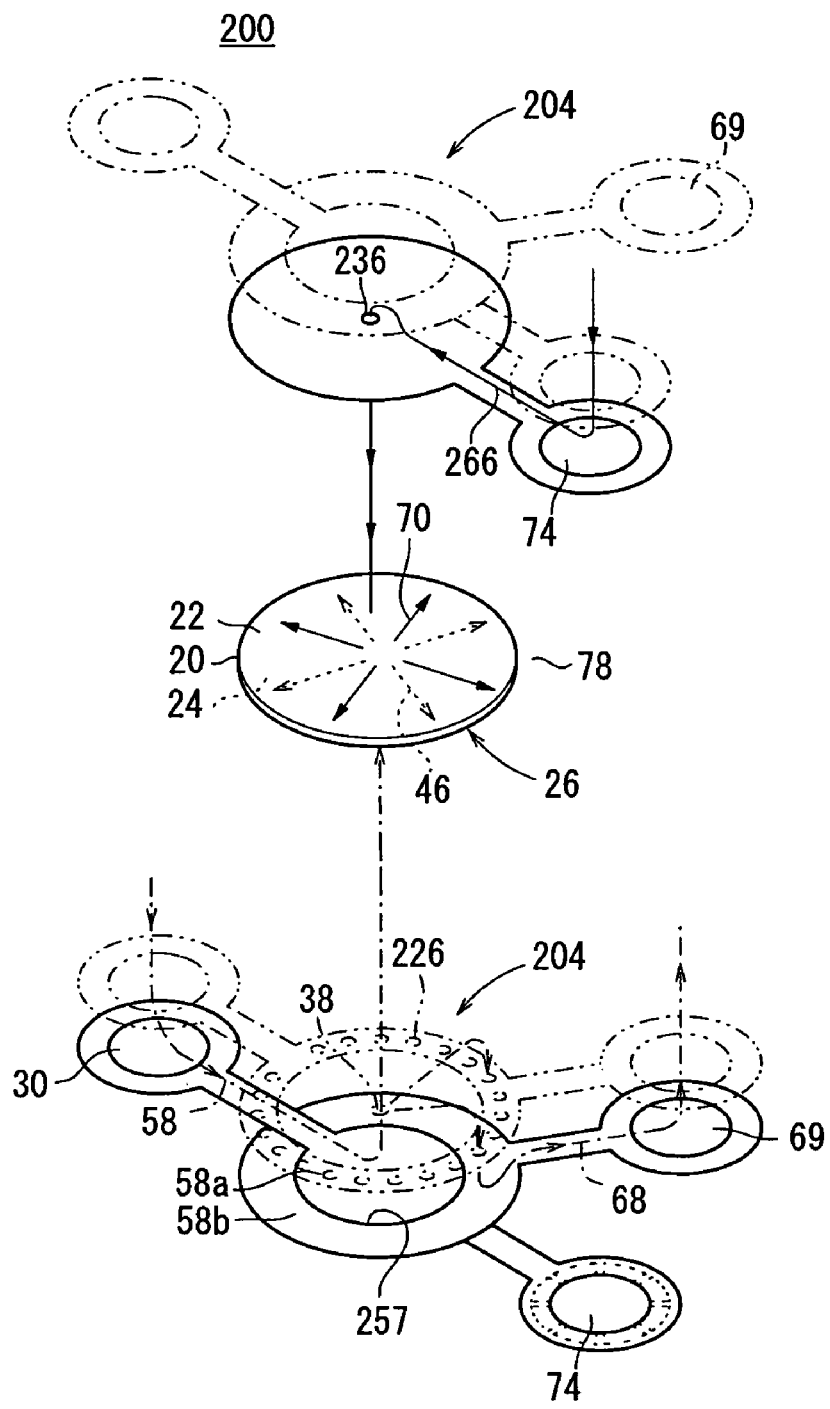
FIG. 15 is a partial exploded perspective view showing gas flows in the fuel cell.

The fuel cell 200 is a solid oxide fuel cell. The fuel cell 200 is used in various applications, including stationary and mobile applications. For example, the fuel cell 200 is mounted on a vehicle. As shown in FIGS. 14 and 15, the fuel cell 200 includes an electrolyte electrode assembly 26 and a pair of separators 204 sandwiching the electrolyte electrode assembly 26. The separator 204 includes first and second plates 206, 208, and a third plate 210 interposed between the first and second plates 206, 208. For example, the first to third plates 206, 208, 210 are metal plates of, e.g., stainless alloy. The first plate 206 and the second plate 208 are joined to both surfaces of the third plate 210 by brazing, for example.

As shown in FIG. 14, the first plate 206 has a fuel gas supply unit 212 and an exhaust fuel gas discharge unit 214. A fuel gas supply passage 30 extends through the fuel gas supply unit 212 for supplying a fuel gas in a stacking direction indicated by the arrow A, and an exhaust fuel gas passage 69 extends through the exhaust fuel gas discharge unit 214 for allowing some of the exhaust fuel gas to flow through the exhaust fuel gas passage 69 in the stacking direction. The fuel gas supply unit 212 and the exhaust fuel gas discharge unit 214 are integral with a first sandwiching section 220 having a relatively large diameter through a first bridge 216 and a second bridge 218. The size of the first sandwiching section 220 and the size of the anode 24 of the electrolyte electrode assembly 26 are substantially the same.

A large number of first protrusions 222 are formed on a surface of the first sandwiching section 220 which contacts the anode 24, in a central region adjacent to an outer circumferential region of the first sandwiching section 220. A ring shaped protrusion 224 is provided in the outer circumferential region of the first sandwiching section 220. The first protrusions 222 contact the anode 24 of the electrolyte electrode assembly 26 and a fuel gas channel 46 for supplying the fuel gas along the anode 24 is formed between the first protrusions 222 and the anode 24 of the electrolyte electrode assembly 26. The first protrusions 222 and the substantially ring shaped protrusion 224 jointly function as a current collector.

A fuel gas inlet 38 is formed at substantially the center of the first sandwiching section 220. The fuel gas is supplied to substantially the center of the anode 24 through the fuel gas inlet 38. A plurality of exhaust gas diversion holes 226 are formed in the outer circumferential region of the first sandwiching section 220. The exhaust fuel gas diversion holes 226 extend through the substantially ring shaped protrusion 224 in the stacking direction. The first protrusions 222 may be formed by making a plurality of recesses in a surface which is in the same plane as the surface of the substantially ring shaped protrusion 224.

The second plate 208 has an oxygen-containing gas supply unit 228. An oxygen-containing gas supply passage 74 for supplying an oxygen-containing gas in the direction indicated by the arrow A extends through the oxygen-containing gas supply unit 228. The oxygen-containing gas supply unit 228 is integral with a second sandwiching section 232 having a relatively large diameter through a narrow third bridge 230.

A plurality of second protrusions 234 are formed on the entire surface of the second sandwiching section 232 which contacts the cathode 22 of the electrolyte electrode assembly 26. The second protrusions 234 contact the cathode 22 of the electrolyte electrode assembly 26, and an oxygen-containing gas channel 70 for supplying the oxygen-containing gas is formed between the second protrusions 234 and the cathode 22. The second protrusions 234 function as a current collector. An oxygen-containing gas inlet 236 is formed at the center of the second sandwiching section 232 for supplying the oxygen-containing gas to substantially the central region of the cathode 22.

As shown in FIG. 15, the fuel gas flows in the fuel gas channel 46, and the oxygen-containing gas flow in the oxygen-containing gas channel 70, from the central regions to the outer circumferential regions of the electrolyte electrode assembly 26. An exhaust gas channel 78 is formed around the electrolyte electrode assembly 26. After the exhaust fuel gas and the exhaust oxygen-containing gas are merged, the merged gas is discharged as an exhaust gas through the exhaust gas channel 78 to the outside of the fuel cell 200.

As shown in FIG. 14, the third plate 210 includes a fuel gas supply unit 238, an exhaust fuel gas discharge unit 240, and an oxygen-containing gas supply unit 242. The fuel gas supply passage 30 extends through the fuel gas supply unit 238, the exhaust fuel gas passage 69 extends through the exhaust fuel gas discharge unit 240, and the oxygen-containing gas supply passage 74 extends through the oxygen-containing gas supply unit 242. The fuel gas supply unit 238, the exhaust fuel gas discharge unit 240, and the oxygen-containing gas supply unit 242 are integral with the third sandwiching section 250 having a relatively large diameter through narrow first to third bridges 244, 246, 248. The first to third sandwiching sections 220, 232, 250 have the same diameter.

Figure 16:
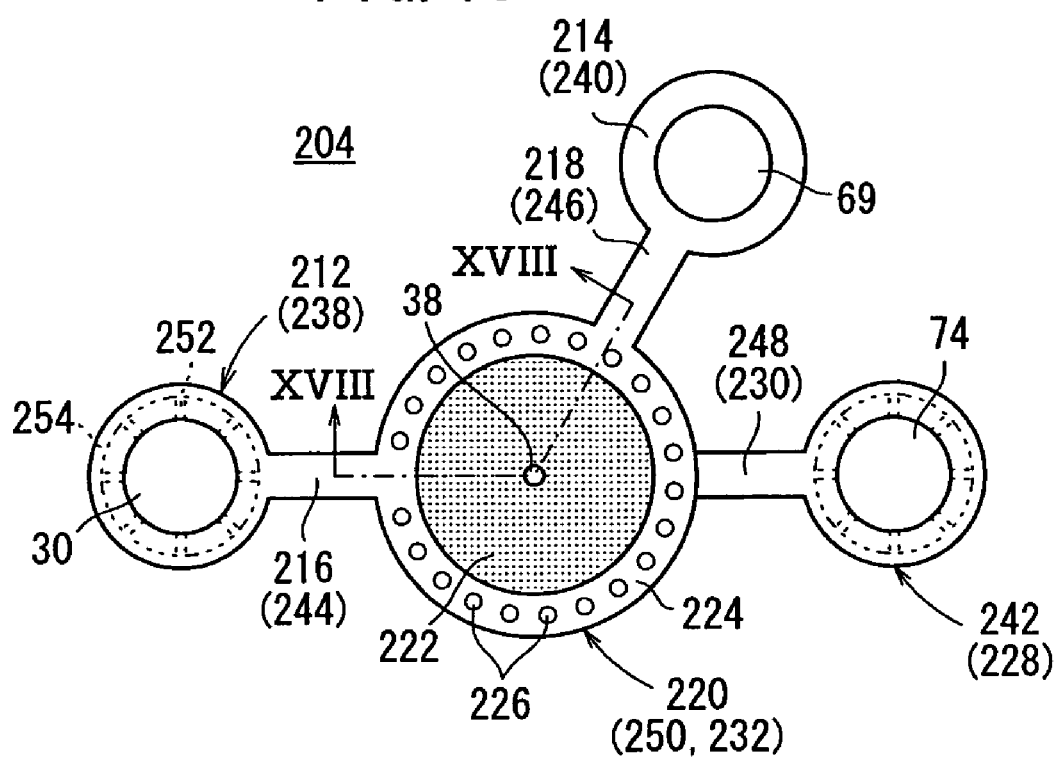
FIG. 16 is a plan view showing the fuel cell.

As shown in FIGS. 14 and 16, the third plate 210 has a plurality of slits 252 radially formed in the fuel gas supply unit 238, on a surface facing the first plate 206. The slits 252 are connected to the fuel gas supply passage 30. Further, the slits 252 are connected to a recess 254 formed around the outer edge of the fuel gas supply unit 238.

A ridge 256 is provided along the first bridge 244 and the outer edge of the third sandwiching section 250. Thus, a fuel gas supply channel 58 extending from the fuel gas supply passage 30 through the slits 252 is formed in the surfaces of the fuel gas supply unit 238, the first bridge 244, and the third sandwiching section 250 (see FIG. 14).

A partition 257 is provided in a surface of the third sandwiching section 250 facing the first plate 206. The partition 257 is coaxial with the center of the third sandwiching section 250, and comprises a substantially ring shaped ridge. The fuel gas supply channel 58 includes first and second fuel gas channel units 58a, 58b separated by the partition 257. A plurality of third protrusions 258 are formed inside the partition 257.

Figure 17:
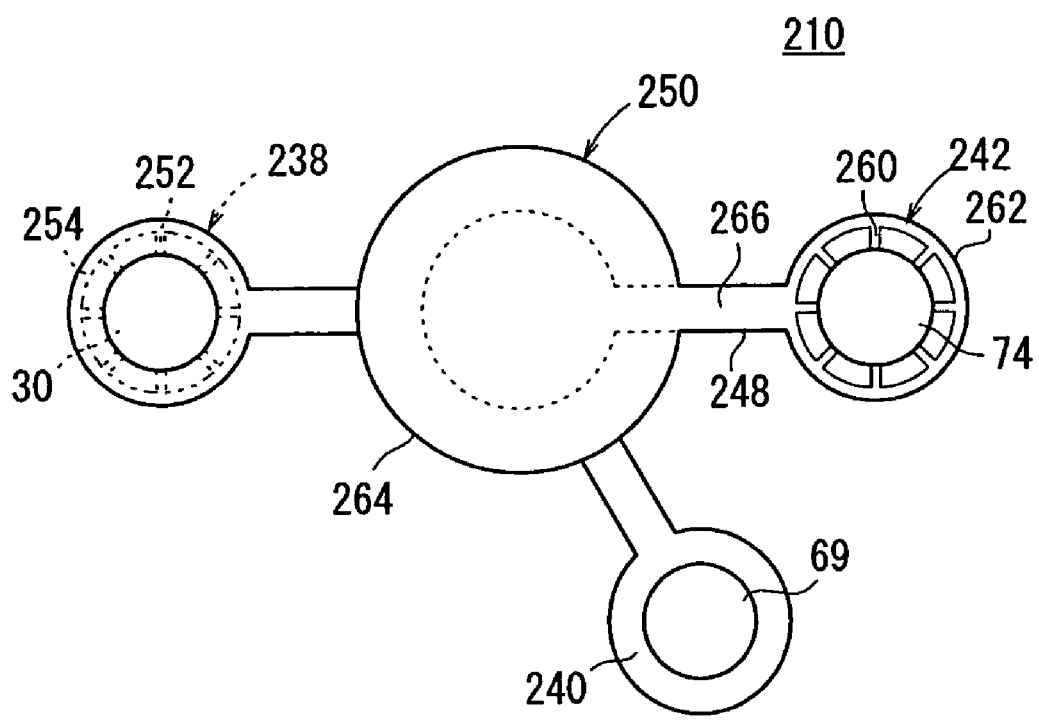
FIG. 17 is a view with partial omission showing the third plate of the fuel cell.

As shown in FIG. 17, the oxygen-containing gas supply unit 242 includes a plurality of slits 260 connected to the oxygen-containing gas supply passage 74 radially formed on a surface of the third plate 210 facing the second plate 208. The slits 260 are connected to the recess 262. The recess 262 prevents the flow of brazing material into the slits 260 and into the area inside the recess 262.

A ridge 264 is provided along the outer edges of the oxygen-containing gas supply unit 242, the third bridge 248, and the third sandwiching section 250. Thus, an oxygen-containing gas supply channel 266 extending from the oxygen-containing gas supply passage 74 through the slits 260 is formed in the surfaces of the oxygen-containing gas supply unit 242, the third bridge 248, and the third sandwiching section 250.

The first plate 206 is fixed to one surface of the third plate 210 by brazing. Thus, the fuel gas channel 46 connected to the fuel gas supply passage 30 is formed between the first and third plates 206, 210. The exhaust fuel gas channel 68 connected to the second fuel gas channel unit 46b and the exhaust fuel gas passage 69 is formed between the second bridge 218 of the first plate 206 and the second bridge 246 of the third plate 210 (see FIGS. 15 and 18).

The first fuel gas channel unit 58a is provided between the first and third sandwiching sections 220, 250, over the electrode surface of the anode 24. The first sandwiching section 220 is provided between the first fuel gas channel unit 58a and the anode 24. When the fuel gas is supplied to the first fuel gas channel unit 58a, the first sandwiching section 220 tightly contacts the anode 24 under pressure. That is, the first fuel gas channel unit 58a forms a first fuel gas pressure chamber 268a. The second fuel gas channel unit 58b is provided between the first and third sandwiching sections 220, 250. When the fuel gas is supplied to the second fuel gas channel unit 58b, the first sandwiching section 220 presses the anode 24 under pressure. That is, the second fuel gas channel unit 58b forms a second fuel gas pressure chamber 268b. The second fuel gas pressure chamber 268b is provided around the first fuel gas pressure chamber 268a.

Figure 18:
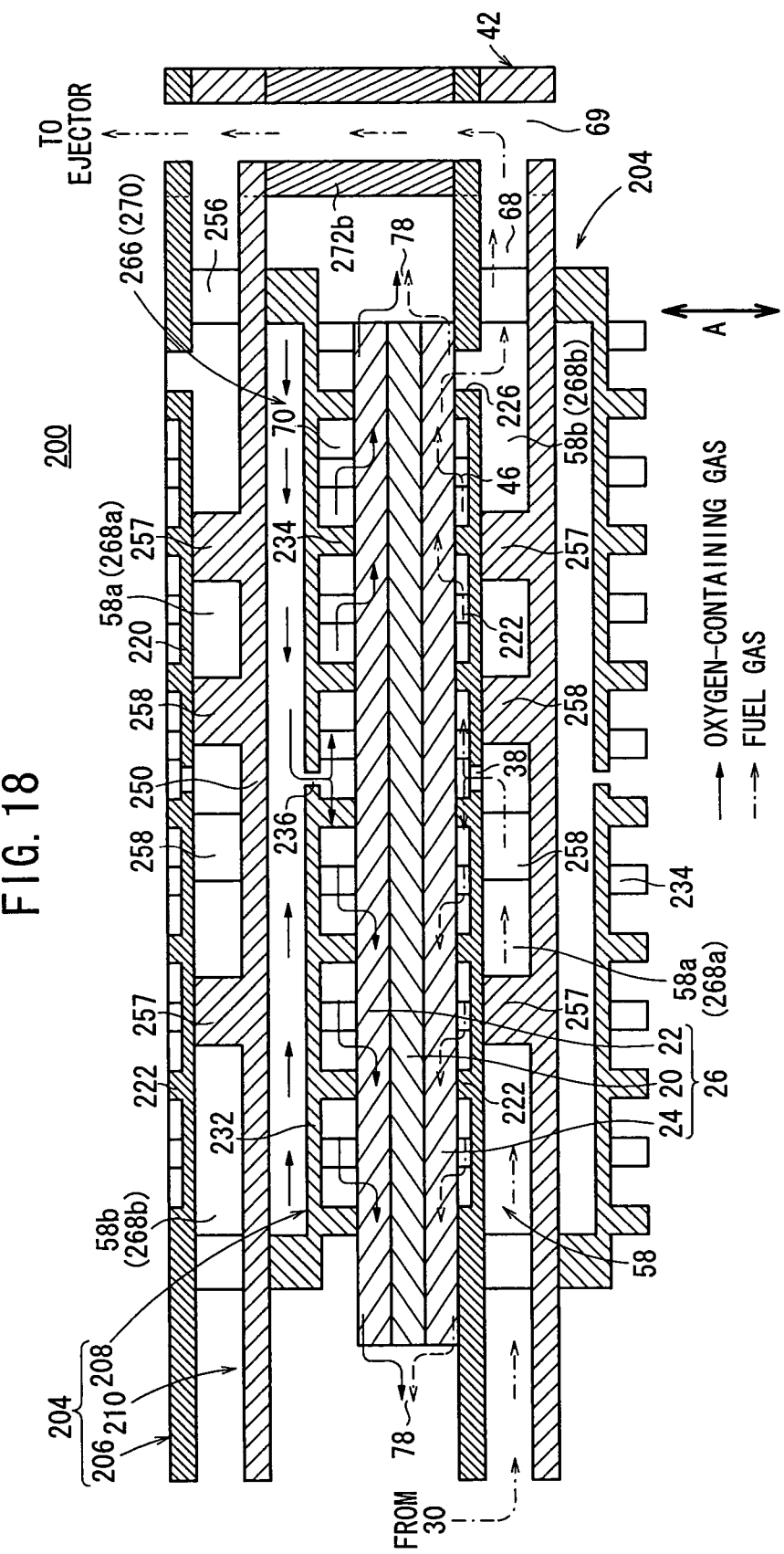
FIG. 18 is a cross sectional view showing the fuel cell taken along a line XVIII-XVIII in FIG. 16.
Figure 19:
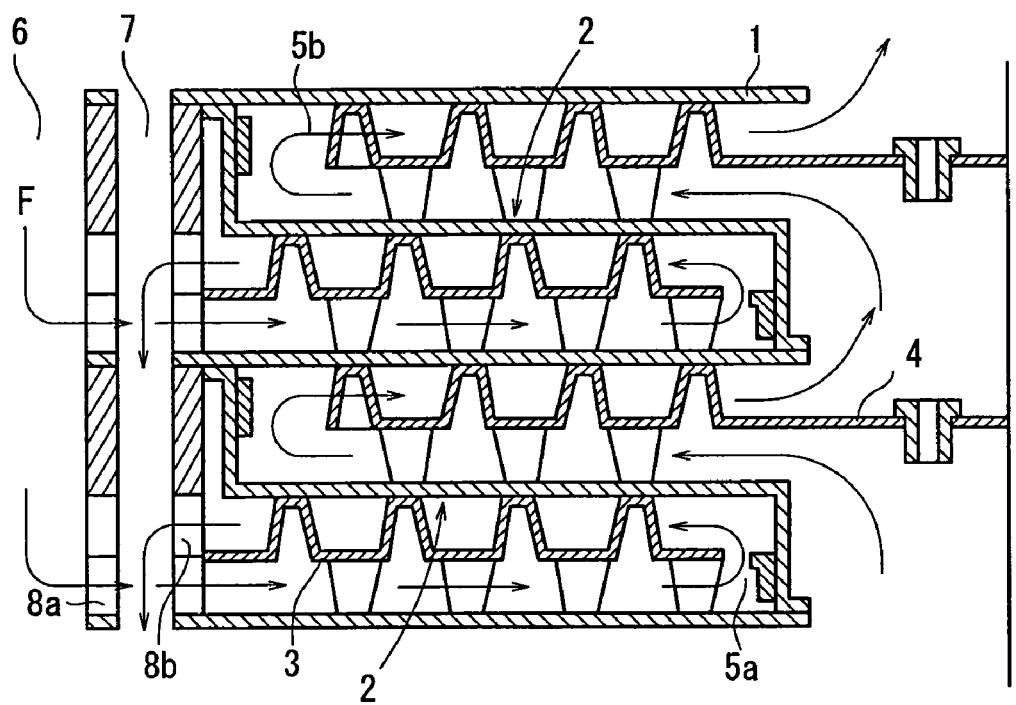
FIG. 19 is a cross sectional view showing a conventional fuel cell.

The second plate 208 is joined to the third plate 210 by brazing to form an oxygen-containing gas channel 70 connected to the oxygen-containing gas supply passage 74 between the second and third plates 208, 210 (FIG. 18). Further, an oxygen-containing gas supply channel 266 is formed between the third bridge 230 of the second plate 208 and the third bridge 248 of the third plate 210.

The oxygen-containing gas supply channel 266 is provided between the second and third sandwiching sections 232, 250 over the electrode surface of the cathode 22. When the oxygen-containing gas is supplied to the oxygen-containing gas supply channel 266, the second sandwiching section 232 presses the cathode 22 under pressure. That is, the oxygen-containing gas supply channel 266 forms an oxygen-containing gas pressure chamber 270.

As shown in FIG. 14, an insulating seal 272a for sealing the fuel gas supply passage 30, an insulating seal 272b for sealing the exhaust fuel gas passage 69, and an insulating seal 272c for sealing the oxygen-containing gas supply passage 74 are provided between the separators 204. For example, the insulating seals 272a to 272c are made of mica material, or ceramic material.

As shown in FIG. 13, the fuel cell stack 202 includes end plates 274a, 274b provided at opposite ends of the fuel cells 200 in the stacking direction. The end plate 274a or the end plate 274b is electrically insulated from tightening bolts 278. A first pipe 276a, a second pipe 276b, and a third pipe 276c extend through the end plate 274a. The first pipe 276a is connected to the fuel gas supply passage 30 of the fuel cell 200, the second pipe 276b is connected to the oxygen-containing gas supply passage 74 of the fuel cell 200, and the third pipe 276c is connected to the exhaust fuel gas passage 69 of the fuel cell 200. The third pipe 276c is connected to the first pipe 276a at an upstream position of the first pipe 276a. The second fuel gas channel unit 58b and the fuel gas supply passage 30 are connected through the exhaust fuel gas passage 69.

The end plate 274a has screw holes 280 at positions above, and under the fuel gas supply passage 30, at positions above, and under the oxygen-containing gas supply passage 74, and at a position corresponding to the exhaust fuel gas passage 69. By screwing tightening bolts 278 into the respective screw holes 280, components of the fuel cell stack 202 are tightened together.

Operation of the fuel cell stack 202 will be described.

A fuel gas is supplied to the first pipe 276a connected to the end plate 274a, and the fuel gas flows from the first pipe 276a to the fuel gas supply passage 30. An oxygen-containing gas (hereinafter referred to as the air) is supplied to the second pipe 276b connected to the end plate 274a, and the air flows from the second pipe 276b to the oxygen-containing gas supply passage 74.

As shown in FIGS. 15 and 18, after the fuel gas flows into the fuel gas supply passage 30, the fuel gas flows in the stacking direction indicated by the arrow A, and is supplied to the fuel gas supply channel 58 in the separator 204 in each of the fuel cells 200. The fuel gas flows along the fuel gas supply channel 58, and flows into the first fuel gas channel unit 58a formed between the first and third sandwiching sections 220, 250. At the center of the first fuel gas channel unit 58a, the fuel gas inlet 38 is formed. The fuel gas flows into the fuel gas inlet 38 toward the fuel gas channel 46.

The fuel gas inlet 38 is provided at a position corresponding to the central position of the anode 24 in each of the electrolyte electrode assemblies 26. Therefore, as shown in FIG. 18, the fuel gas from the fuel gas inlet 38 is supplied to the fuel gas channel 46, and flows from the central region of the anode 24 to the outer circumferential region of the anode 24.

After the air flows into the oxygen-containing gas supply passage 74, as shown in FIG. 15, the oxygen-containing gas flows through the oxygen-containing gas supply channel 266 in the separator 204, and is supplied to the oxygen-containing gas pressure chamber 270 formed between the second and third sandwiching sections 232, 250. The air flows into the oxygen-containing gas inlet 236 at the center of the second sandwiching section 232.

The oxygen-containing gas inlet 236 is provided at a position corresponding to the central position of the cathode 22 in each of the electrolyte electrode assemblies 26. Therefore, as shown in FIG. 18, the air from the oxygen-containing gas inlet 236 is supplied to the oxygen-containing gas channel 70, and flows from the central region of the cathode 22 to the outer circumferential region of the cathode 22.

Thus, in each of the electrolyte electrode assemblies 26, the fuel gas is supplied from the central region of the anode 24 to the outer circumferential region of the anode 24, and the air is supplied from the central region of the cathode 22 to the outer circumferential region of the cathode 22 for generating electricity. After the fuel gas and the air are consumed in the power generation, the fuel gas and the air are discharged as an exhaust gas into the exhaust gas channel 78.

In the fourth embodiment, some of the fuel gas moving from the central region to the outer circumferential region of the anode 24 is consumed in the reaction at the anode 24, and then, discharged as the exhaust fuel gas containing unconsumed hydrogen. The remaining fuel gas flows through a plurality of exhaust fuel gas diversion holes 226 formed in the substantially ring shaped protrusion 224 of the first sandwiching section 220, and flows into the second fuel gas channel unit 58b (see FIG. 18). The exhaust fuel gas flows through the exhaust fuel gas channel 68 connected to the second fuel gas channel unit 58b, and flows into the exhaust fuel gas passage 69. Then, the exhaust fuel gas flows along the exhaust fuel gas passage 69 in the direction indicated by the arrow A.

Thereafter, as shown in FIG. 13, the exhaust fuel gas flows along the third pipe 276c connected to the exhaust fuel gas passage 69, and flows into the first pipe 276a at the upstream position. In the structure, the exhaust fuel gas is mixed with the fresh fuel gas before reaction, and flows from the first pipe 276a to the fuel gas supply passage 30. Since the unconsumed fuel gas contained in the exhaust fuel gas which has passed through the fuel gas channel 46 along the anode 24 is utilized again reliably, the same advantages as in the case of the first to third embodiments can be achieved. For example, the utilization ratio of the fuel gas can be improved effectively.

The invention claimed is:

1. A fuel cell formed by stacking an electrolyte electrode assembly and separators, said electrolyte electrode assembly comprising an anode, a cathode, and an electrolyte interposed between said anode and said cathode, said electrolyte electrode assembly being sandwiched between said separators, said separators each comprising:

a sandwiching section having a fuel gas channel for supplying a fuel gas along an electrode surface of said anode and an oxygen-containing gas channel for supplying an oxygen-containing gas along an electrode surface of said cathode, separately;

a first bridge connected to said sandwiching section, and having a fuel gas supply channel for supplying the fuel gas to said fuel gas channel;

a fuel gas supply unit connected to said first bridge, a fuel gas supply passage extending through said fuel gas supply unit in a stacking direction for supplying the fuel gas to said fuel gas supply channel;

a second bridge connected to said sandwiching section, and having an exhaust fuel gas channel for discharging the fuel gas after consumption as an exhaust fuel gas from said fuel gas channel;

an exhaust fuel gas discharge unit connected to said second bridge, and having an exhaust fuel gas passage for allowing the exhaust fuel gas to flow in the stacking direction; and a reformer for reforming a fuel to produce the fuel gas supplied to said anode wherein said exhaust fuel gas discharge unit is fluidly connected to said reformer so that said exhaust fuel gas passage communicates with said fuel gas channel through said reformer and said fuel gas supply passage.

2. A fuel cell according to claim 1, wherein an ejector is connected to said reformer on an upstream side thereof; and said exhaust fuel gas passage is connected to said reformer through said ejector.

3. A fuel cell according to claim 1, wherein said fuel gas channel has a channel unit provided on a surface of said separator facing said anode; and said channel unit is connected to said exhaust fuel gas channel.

4. A fuel cell according to claim 3, wherein said channel unit is formed by at least a groove, protrusions, or a wall.

5. A fuel cell according to claim 1, wherein a ring shaped protrusion which contacts an outer circumferential region of said anode is formed on a surface of said separator facing said anode.

6. A fuel cell module comprising a fuel cell stack placed in a casing, said fuel cell stack being formed by stacking a plurality of fuel cells each including an electrolyte electrode assembly and separators sandwiching said electrolyte electrode assembly, said electrolyte electrode assembly comprising an anode, a cathode, and an electrolyte interposed between said anode and said cathode, wherein a reformer for reforming a fuel to produce a fuel gas supplied to said anode, and an ejector connected to said reformer on an upstream side thereof for returning the fuel gas after consumption in said fuel cell as an exhaust fuel gas to said reformer are provided in said casing;

wherein said separators sandwiching said electrolyte electrode assembly each comprising:

a sandwiching section having a fuel gas channel for supplying the fuel gas along an electrode surface of said anode and an oxygen-containing gas channel for supplying an oxygen-containing gas along an electrode surface of said cathode, separately;

a first bridge connected to said sandwiching section, and having a fuel gas supply channel for supplying the fuel gas to said fuel gas channel;

a fuel gas supply unit connected to said first bridge, a fuel gas supply passage extending through said fuel gas supply unit in a stacking direction for supplying the fuel gas to said fuel gas supply channel;

a second bridge connected to said sandwiching section, and having an exhaust fuel gas channel for discharging the fuel gas after consumption as an exhaust fuel gas from said fuel gas channel; and an exhaust fuel gas discharge unit fluidly connected to said second bridge, and having an exhaust fuel gas passage for allowing the exhaust fuel gas to flow in the stacking direction, wherein said exhaust fuel gas discharge unit is connected to said fuel gas channel through said fuel gas supply passage.

7. A fuel cell module according to claim 6, wherein said fuel gas channel has a channel unit provided on a surface of said separator facing said anode; and said channel unit is connected to said exhaust fuel gas channel.

8. A fuel cell module according to claim 6, wherein said channel unit is formed by at least a groove, protrusions, or a wall.

9. A fuel cell module according to claim 6, wherein a ring shaped protrusion which contacts an outer circumferential region of said anode is formed on a surface of said separator facing said anode.

* * * * *